United States Patent
Yoshima et al.

(10) Patent No.: US 11,018,377 B2
(45) Date of Patent: May 25, 2021

(54) SECONDARY BATTERY, BATTERY PACK, AND VEHICLE

(71) Applicant: KABUSHIKI KAISHA TOSHIBA, Minato-ku (JP)

(72) Inventors: Kazuomi Yoshima, Yokohama (JP); Shinsuke Matsuno, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 310 days.

(21) Appl. No.: 15/907,741

(22) Filed: Feb. 28, 2018

(65) Prior Publication Data
US 2019/0089009 A1    Mar. 21, 2019

(30) Foreign Application Priority Data
Sep. 19, 2017 (JP) .............................. JP2017-178760

(51) Int. Cl.
H01M 4/00 (2006.01)
H01M 10/38 (2006.01)
(Continued)

(52) U.S. Cl.
CPC .............. H01M 10/38 (2013.01); B60L 50/64 (2019.02); B60L 53/00 (2019.02); B60L 58/21 (2019.02);
(Continued)

(58) Field of Classification Search
CPC ........ H01M 10/38; H01M 4/505; H01M 4/48; H01M 4/5825; H01M 4/525; H01M 10/46;
(Continued)

(56) References Cited

U.S. PATENT DOCUMENTS

2008/0070113 A1    3/2008  Kondo et al.
2012/0276457 A1   11/2012  Hirose et al.
(Continued)

FOREIGN PATENT DOCUMENTS

JP    2001-43892    2/2001
JP    2005-243342   9/2005
(Continued)

OTHER PUBLICATIONS

Manjunatha, H., Suresh, G.S. & Venkatesha, T.V. "Electrode materials for aqueous rechargeable lithium batteries", J Solid State Electrochem (2011) 15: 431. https://doi.org/10.1007/s10008-010-1117-6 (Year: 2011).*

(Continued)

*Primary Examiner* — Nicholas P D'Aniello
(74) *Attorney, Agent, or Firm* — Oblon, McClelland, Maier & Neustadt, L.L.P.

(57) ABSTRACT

According to one embodiment, a secondary battery is provided. The secondary battery includes a positive electrode, an aqueous electrolyte, a separator, and a negative electrode including a negative electrode active material-containing layer. The negative electrode active material-containing layer includes negative electrode active material particles and solid electrolyte particles having lithium ion conductivity. The porosity of the negative electrode active material-containing layer is within a range of 0.1% to 28%. The water content of the negative electrode active material-containing layer is within a range of 0.01 g/cm³ to 0.4 g/cm³.

20 Claims, 7 Drawing Sheets

(51) Int. Cl.
| | | |
|---|---|---|
| *H01M 4/485* | (2010.01) | |
| *H01M 10/42* | (2006.01) | |
| *H01M 10/46* | (2006.01) | |
| *H01M 4/525* | (2010.01) | |
| *H01M 4/58* | (2010.01) | |
| *H01M 4/48* | (2010.01) | |
| *H02J 7/14* | (2006.01) | |
| *H01M 4/505* | (2010.01) | |
| *B60L 53/00* | (2019.01) | |
| *H01M 4/62* | (2006.01) | |
| *H01M 10/36* | (2010.01) | |
| *B60L 50/64* | (2019.01) | |
| *B60L 58/21* | (2019.01) | |
| *H01M 50/20* | (2021.01) | |
| *B60L 7/10* | (2006.01) | |
| *H01M 4/02* | (2006.01) | |

(52) U.S. Cl.
CPC ............ *H01M 4/48* (2013.01); *H01M 4/485* (2013.01); *H01M 4/505* (2013.01); *H01M 4/525* (2013.01); *H01M 4/5825* (2013.01); *H01M 4/628* (2013.01); *H01M 10/36* (2013.01); *H01M 10/425* (2013.01); *H01M 10/46* (2013.01); *H01M 50/20* (2021.01); *H02J 7/14* (2013.01); *B60L 7/10* (2013.01); *B60L 2240/545* (2013.01); *B60L 2240/547* (2013.01); *H01M 4/622* (2013.01); *H01M 2004/021* (2013.01); *H01M 2004/027* (2013.01); *H01M 2010/4271* (2013.01); *H01M 2220/20* (2013.01); *H01M 2300/0002* (2013.01); *H01M 2300/0068* (2013.01); *H01M 2300/0071* (2013.01); *H01M 2300/0082* (2013.01); *H01M 2300/0091* (2013.01)

(58) Field of Classification Search
CPC .. H01M 10/425; H01M 2/1077; H01M 4/485; H01M 2300/0002; H01M 2300/0082; H01M 2300/0071; H01M 2300/0068; H01M 2300/0091; H01M 2220/20; H01M 2010/4271; H01M 10/36; H01M 4/628; H01M 2004/027; H01M 2004/021; H01M 4/622; H02J 7/14; B60L 50/64; B60L 58/21; B60L 53/00; B60L 7/10; B60L 2240/547; B60L 2240/545
See application file for complete search history.

(56) References Cited

U.S. PATENT DOCUMENTS

| | | |
|---|---|---|
| 2014/0377627 A1 | 12/2014 | Furuya et al. |
| 2015/0318530 A1 | 11/2015 | Yushin et al. |
| 2016/0043430 A1 | 2/2016 | Lee et al. |
| 2017/0222272 A1 | 8/2017 | Takami et al. |

FOREIGN PATENT DOCUMENTS

| | | |
|---|---|---|
| JP | 2008-59955 | 3/2008 |
| JP | 2010-056027 | 3/2010 |
| JP | 2013-243112 | 12/2013 |
| JP | 2015-2069 | 1/2015 |
| JP | 2016-502746 | 1/2016 |
| JP | 2016-143577 | 8/2016 |
| JP | 2016-189339 | 11/2016 |
| JP | 2017-4783 | 1/2017 |
| WO | WO 2016/114141 A1 | 7/2016 |
| WO | WO 2017/135323 | 8/2017 |

OTHER PUBLICATIONS

S. Liu et al. "Rechargeable Aqueous Lithium-Ion Battery of $TiO_2$/$LiMn_2O_4$ with a High Voltage," Journal of the Electrochemical Society, 158 (12) A1490-A1497, 2011, pp. 8.

* cited by examiner

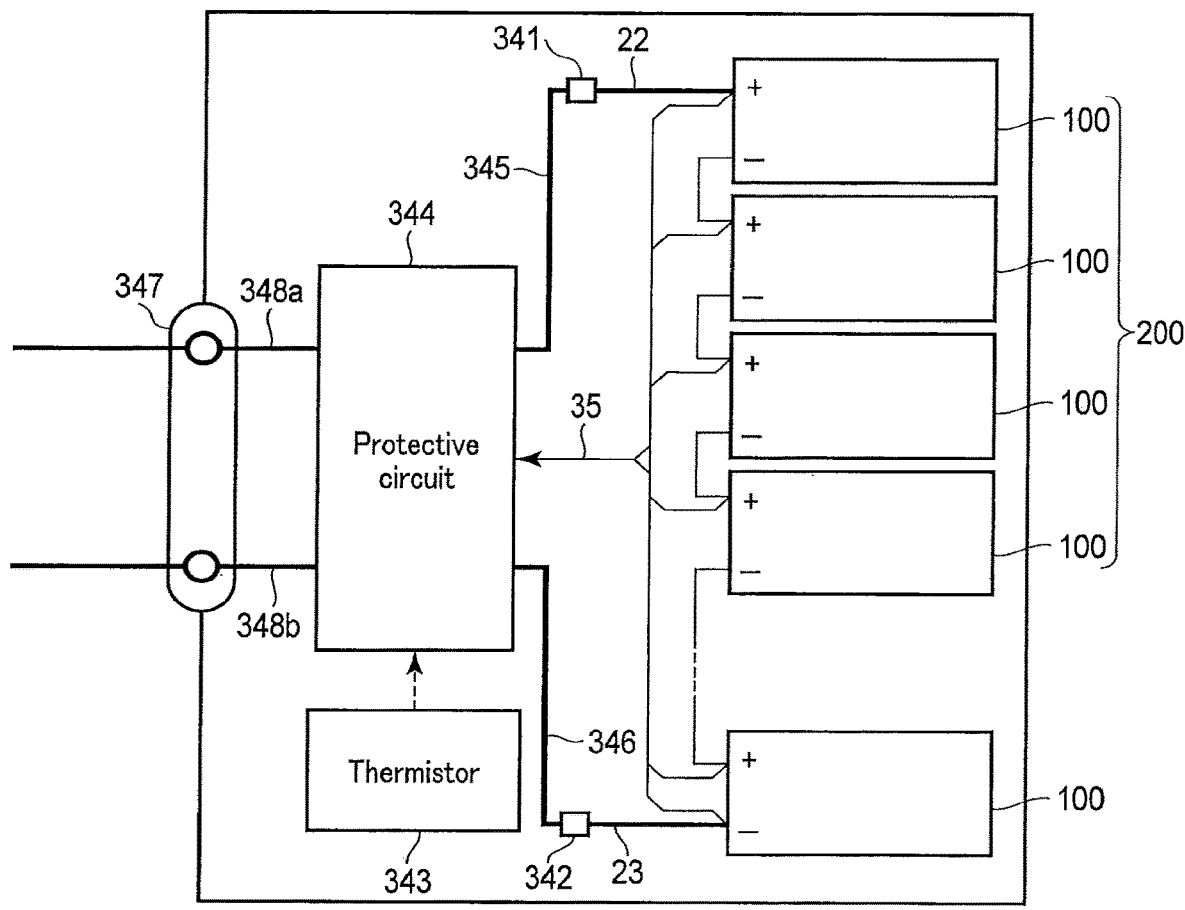
F I G. 8
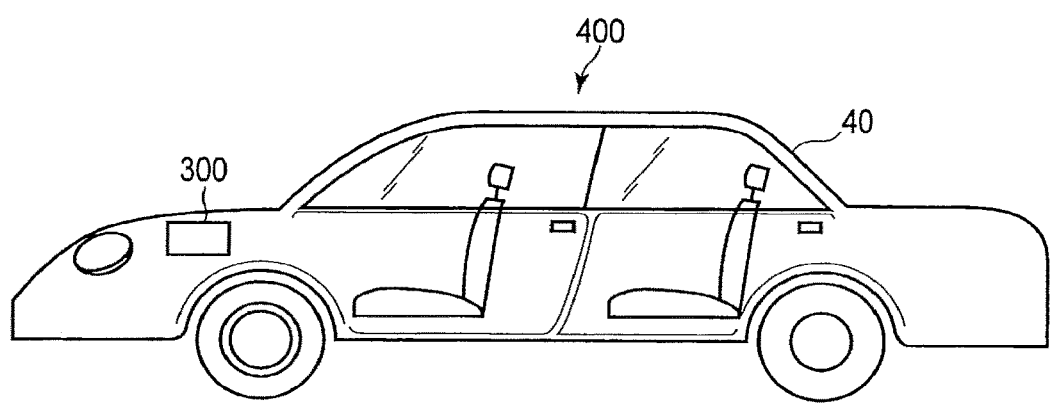
F I G. 9

SECONDARY BATTERY, BATTERY PACK, AND VEHICLE

CROSS-REFERENCE TO RELATED APPLICATIONS

This application is based upon and claims the benefit of priority from Japanese Patent Application No. 2017-178760, filed Sep. 19, 2017, the entire contents of which are incorporated herein by reference.

FIELD

Embodiments described herein relate generally to a secondary battery, a battery pack, and a vehicle.

BACKGROUND

A nonaqueous electrolyte battery, particularly, a lithium secondary battery using a carbon material or lithium titanium oxide as a negative electrode active material and a layered oxide containing nickel, cobalt, and manganese as positive electrode active materials has already been put into practical use as a power supply in a broad field. The form of such a nonaqueous electrolyte battery widely ranges from a small battery for various kinds of electronic devices to a large battery for an electric automobile. These lithium secondary batteries use, as the electrolytic solution, a non-aqueous organic solvent containing ethylene carbonate or methyl ethyl carbonate, unlike a nickel hydrogen battery or a lead storage battery. Electrolytic solutions using these solvents have high resistance to oxidation and high resistance to reduction as compared to an aqueous electrolyte solution, and electrolysis of the solvents hardly occurs. For this reason, a nonaqueous lithium secondary battery can implement a high electromotive force of 2 to 4.5 V.

On the other hand, since many organic solvents are combustible, the safety of a secondary battery using an organic solvent readily becomes lower than that of a secondary battery using an aqueous solution in principle. Although various measures are taken to improve the safety of a lithium secondary battery using an electrolytic solution containing an organic solvent, they are not necessarily enough. In addition, a nonaqueous lithium secondary battery requires a dry environment in its manufacturing process, and the manufacturing cost inevitably rises. Furthermore, since an electrolytic solution containing an organic solvent is poor in conductivity, the internal resistance of the nonaqueous lithium secondary battery readily becomes high. These problems are great disadvantages for a large storage battery used in an electronic automobile, a hybrid electronic automobile, or an electric power storage for which the battery safety and the battery cost are of importance.

In order to solve these problems, studies have been made to change an nonaqueous electrolytic solution into an aqueous solution. In an aqueous electrolytic solution, a potential range in which charge and discharge of a battery are executed needs to be limited to a potential range in which an electrolysis reaction of water contained as a solvent does not occur. For example, when lithium manganese oxide is used as a positive electrode active material, and lithium vanadium oxide is used as a negative electrode active material, electrolysis of water can be avoided. With the combination of these materials, an electromotive force of about 1 to 1.5 V is obtained. However, a sufficient energy density as a battery can hardly be obtained.

When lithium-manganese oxides are used as the positive electrode active material and lithium-titanium oxides such as $LiTi_2O_4$, $Li_4Ti_5O_{12}$, or the like are used as the negative electrode active material, an electromotive force of about 2.6 to 2.7 V is theoretically obtained, and it may be an attractive battery from the viewpoint of energy density. A nonaqueous lithium secondary battery employing such combination of positive and negative electrode materials has the excellent life time performance, and such a battery has already been put to practical use. However, in an aqueous electrolytic solution, since the potential of lithium insertion/extraction of lithium-titanium oxides is about 1.5 V (vs. Li/Li$^+$) based on lithium potential, the electrolysis of water easily occurs. On the other hand, even in the lithium Mn oxide of the positive electrode, there was a problem that the oxidation of the cations in the aqueous solution occurred and gas was generated, and satisfactory charge-and-discharge was impossible.

BRIEF DESCRIPTION OF THE DRAWINGS

FIG. 8 is a block diagram showing an example of an electric circuit of the battery pack shown in FIG. 7;

FIG. 9 is a sectional view schematically showing an example of a vehicle according to the third embodiment.

DETAILED DESCRIPTION

Figure 1:
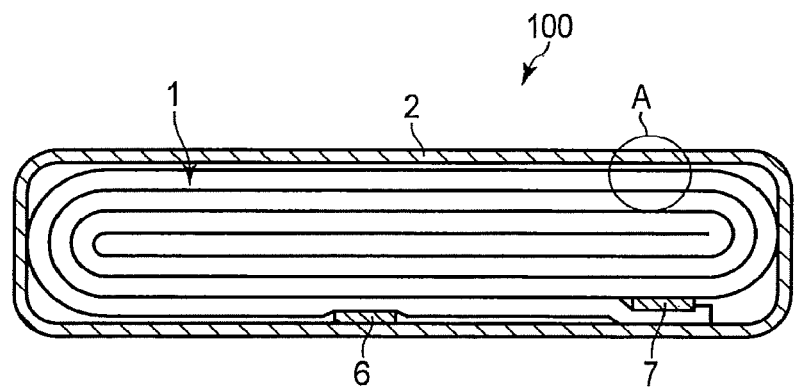
FIG. 1 is a sectional view schematically showing an example of a secondary battery according to the first embodiment.

According to a first embodiment, a secondary battery is provided. The secondary battery includes a positive electrode, an aqueous electrolyte, a separator, and a negative electrode including a negative electrode active material-containing layer. The negative electrode active material-containing layer includes negative electrode active material particles and solid electrolyte particles having lithium ion conductivity. The porosity of the negative electrode active material-containing layer is within a range of 0.1% to 28%. The water content of the negative electrode active material-containing layer is within a range of 0.01 g/cm$^3$ to 0.4 g/cm$^3$.

According to a second embodiment, a battery pack is provided. The battery pack includes the secondary battery according to the first embodiment.

According to a third embodiment, a vehicle is provided. The vehicle includes the battery pack according to the second embodiment.

Embodiments are explained below, referring to drawings. The same number is applied to common structures throughout the following embodiments, and overlapped explanations are omitted. In addition, each drawing is a schematic view for encouraging explanations of the embodiment and understanding thereof, and thus there are some details in which a shape, a size and a ratio are different from those in a device actually used, but they can be appropriately design-changed considering the following explanations and known technology.

First Embodiment

According to a first embodiment, a secondary battery is provided. The secondary battery includes a positive electrode, an aqueous electrolyte, a separator, and a negative electrode including a negative electrode active material-containing layer. The negative electrode active material-containing layer includes negative electrode active material particles and solid electrolyte particles having lithium ion conductivity. The porosity of the negative electrode active material-containing layer is within a range of 0.1% to 28%. The water content of the negative electrode active material-containing layer is within a range of 0.01 g/cm³ to 0.4 g/cm³.

In the negative electrode of the secondary battery including the aqueous electrolyte, electrolysis of water tends to occur due to low hydrogen overvoltage. The electrolysis of water is represented by Formula 1 below.

$$2H_2O \rightarrow H_2 + 2OH^- \quad (1)$$

The inventors of the present application found that decreasing the amount of water molecules in the negative electrode layer (negative electrode active material-containing layer) made it difficult for the reaction of Formula (1) to proceed to the right, and charge-and-discharge property, preservation characteristic, and cycle life time performance could be improved.

Specifically, in order to reduce the amount of water molecules in the negative electrode layer, the negative electrode layer contains solid electrolyte particles having lithium ion conductivity together with the negative electrode active material particles. When the negative electrode layer contains the solid electrolyte particles, the negative electrode density can be improved, and the water content in the negative electrode layer can be reduced. Therefore, electrolysis of water represented by Formula (1) that occurs in the negative electrode layer is suppressed.

At this time, the porosity of the negative electrode layer is within a range of 0.1% to 28%, and the water content of the negative electrode layer is within a range of 0.01 g/cm³ to 0.4 g/cm³. When the porosity and the water content of the negative electrode layer are within these ranges, the internal resistance in the negative electrode layer is low and the water content in the negative electrode layer is also low.

If the negative electrode density is increased by containing solid electrolyte particles not having lithium ion conductivity in the negative electrode layer, the water content in the negative electrode layer can be reduced, but the internal resistance of the negative electrode layer is increased. As a result, the battery performance is lowered.

On the other hand, when solid electrolyte particles having lithium ion conductivity are mixed in the electrode layer, the electrode density can be increased without increasing the internal resistance of the electrode layer. Therefore, in this case, even if a small amount of electrolyte is present in the electrode layer, charge and discharge can be sufficiently performed.

When the electrolysis of water occurs, the charge efficiency is reduced and the charge capacity becomes excessive. Thus, the charge-and-discharge efficiency (ratio of a discharge capacity to a charge capacity) is low. However, when the electrolysis of water hardly occurs by virtue of the secondary battery according to the embodiment, over-charge can be suppressed, thereby achieving excellent charge-and-discharge efficiency.

In addition, when the electrolysis of water occurs in the negative electrode, the charge-and-discharge efficiency of the negative electrode becomes lower than the charge-and-discharge efficiency of the positive electrode. Therefore, by repeating the charge-and-discharge cycle, the positive electrode gradually becomes over-charged and the positive electrode is deteriorated at an early stage. However, if the electrolysis of water in the negative electrode can be suppressed, the positive electrode is hardly deteriorated, thereby improving cycle life performance of the secondary battery. Similarly, if the electrolysis of water in the negative electrode can be suppressed, deterioration of the positive electrode when the battery is stored for a long time can be prevented and preservation characteristic is also improved.

As described above, the secondary battery according to the embodiment can achieve excellent charge-and-discharge property, preservation characteristic, and cycle life performance.

The positive electrode, the negative electrode, and the separator can constitute an electrode group. The aqueous electrolyte is stored in the electrode group. The secondary battery can further include a container member which is configured to store the electrode group and the aqueous electrolyte.

In addition, the secondary battery can further include a negative electrode terminal electrically connected to the negative electrode and a positive electrode terminal electrically connected to the positive electrode.

Hereinafter, the negative electrode, the positive electrode, the separator, the solid electrolyte, the aqueous electrolyte, the container member, the negative electrode terminal, and the positive electrode terminal will be described in detail.

(1) Negative Electrode

The negative electrode includes a negative electrode current collector, and a negative electrode active material-containing layer carried on one surface or both surfaces of the negative electrode current collector and containing negative electrode active material particles, solid electrolyte particles, a conductive agent, and a binder.

To stably operate the negative electrode active material in the aqueous electrolyte, the negative electrode current collector is preferably made of zinc.

Near a potential where a charge-and-discharge reaction for a titanium-containing oxide holds, hydrogen generation caused by electrolysis of the aqueous electrolyte readily occurs. In particular, electrolysis readily occurs on a current collector with high conductivity. Since the active material is easily separated from the current collector by bubbles of generated hydrogen, a continuous charge-and-discharge reaction to the active material hardly holds. Since zinc hardly causes hydrogen generation, separation of the active material layer from the current collector hardly occurs, and charge and discharge for the titanium-containing oxide are possible even at about 1.5 V in a standard lithium potential. Zinc is an inexpensive metal and is preferable from this viewpoint as well.

Even if an element other than zinc is included in the current collector, the same effect can be obtained. The element other than zinc is preferably at least one selected from Ga, In, Bi, Tl, Sn, Pb, Ti, Al, Sn, and Pb. By including these metals as an alloy or a single metal, the mechanical strength of the current collector can be increased and the processing performance can be improved. Furthermore, when these metals are included, the electrolysis can be suppressed and the generation of hydrogen can be more controlled. Among these metals, more preferable metals are Pb, Ti, and Al.

The same effect can be obtained even if zinc, or alloys containing zinc, or mixtures of zinc and other metals are present on the surface of the current collector. Specifically, these metals may be plated on another substrate, for example, Al. Al, Fe, Cu, Ni, and Ti are preferable as the metal serving as the substrate, and Al and Ti are more preferable. The thickness of plating including zinc present on the surface of the current collector is preferably 0.1 μm to 10 μm. When the thickness is less than 0.1 μm, the effect of suppressing the generation of hydrogen is small, and when the thickness exceeds 10 μm, it is feared that the adhesion with the metal serving as the substrate is deteriorated. A more preferable range is 0.2 μm to 2 μm.

The thickness of the negative electrode current collector is, for example, 10 μm to 500 μm. If the thickness is less than 10 μm, tearing during the manufacture occurs at a high possibility. If the thickness exceeds 500 μm, the volume energy density of the battery may lower. The thickness of the negative electrode current collector is preferably 20 μm or less, and more preferably 15 μm or less.

A negative electrode active material-containing layer is provided on at least one surface of the negative electrode current collector. For example, the negative electrode active material-containing layer may be provided on one surface of the negative electrode current collector, and the negative electrode active material-containing layer may be provided on one surface of the negative electrode current collector and the rear surface thereof.

The porosity of the negative electrode active material-containing layer is within a range of 0.1% to 28%. When the porosity is within a range of 0.1% to 28%, sufficient lithium ion diffusion in the negative electrode active material-containing layer is possible. When the porosity is lower than 0.1%, the dispersion resistance of lithium ions may become too high. When the porosity is higher than 28%, the internal resistance in the negative electrode active material-containing layer tends to be high. In addition, the mechanical strength of the electrode tends to be low. The porosity of the negative electrode active material-containing layer is preferably within a range of 0.3% to 25%, and more preferably 1% to 18%.

A method of calculating the porosity of the negative electrode active material-containing layer will be described.

The porosity (percentage) is calculated by dividing the electrode density (negative electrode density or positive electrode density to be described later) by the true density of the electrode as represented in Formula 1 below. A method of measuring the electrode density and the true density of the electrode will be described later. The "electrode density" and the "true density of the electrode" consider only the active material-containing layer and do not consider the current collector.

$$\text{Porosity (\%)} = \text{(Electrode Density)} / \text{(True Density of Electrode)} \times 100 \quad (1)$$

To calculate the true density of the electrode, first, the identification of each material (also referred to as electrode material) constituting the active material-containing layer is performed and the mixing ratio thereof is measured.

Identification of the electrode material is performed by an inductively coupled plasma (ICP) emission spectroscopic analysis method and energy dispersive X-ray spectrometry (EDS). The determination of the mixing ratio is performed by measuring the weight ratio of a binder, a conductive auxiliary agent, and an active material, which have different thermal decomposition temperatures, through thermo gravimetry (TG).

<ICP Emission Spectroscopic Analysis>

First, a measurement sample is prepared by the following procedure.

A secondary battery to be analyzed is prepared. The battery to be analyzed has a capacity of 80% or more of a nominal capacity.

The secondary battery is set to a discharge state. For example, the secondary battery can be set to the discharge state by performing a discharge until a battery voltage reaches 2.1 V by a constant current of 5 C or less.

Next, the battery is disassembled and the electrode is extracted. The extracted electrode is cleaned with, for example, pure water. Due to the cleaning, electrolyte salt attached to the surface of the electrode can be removed. Next, the washed electrode is dried. Thus, an electrode sample as the measurement sample can be obtained.

Subsequently, part of the electrode sample is placed in an appropriate solvent and irradiated with an ultrasonic wave. For example, the electrode sample is put in ethyl methyl carbonate prepared in a glass beaker and is vibrated in an ultrasonic washer. In this manner, an active material-containing layer can be peeled off from a current collector. Next, the peeled active material-containing layer is dried by drying under reduced pressure. By pulverizing the obtained active material-containing layer with a mortar or the like, a powder containing an active material, a conductive agent, a binder, components of a coating film, and the like is obtained. By dissolving this powder with an acid, a liquid sample containing the active material can be prepared. At this time, hydrochloric acid, nitric acid, sulfuric acid, hydrogen fluoride, and the like can be used as the acid. By subjecting this liquid sample to ICP emission spectroscopic analysis, metal elements contained in the active material-containing layer can be quantified.

<EDS Analysis>

An electrode sample (after drying) as the measurement sample is prepared in the same manner as in the ICP analysis procedure described above. EDS analysis is performed on the surface and the cross section of the electrode sample. The cross section of the electrode sample can be prepared by cutting the electrode sample using focused ion beam (FIB). EDS spectra are extracted from EDS element mapping data on the surface and the cross section, and analysis is performed thereon. As a result, the metal elements contained in the electrode sample can be qualified.

<Thermo Gravimetry>

According to the described method using the ICP emission spectroscopic analysis described above, a powder containing each material constituting the active material-containing layer is obtained. This powder is, for example, a powder containing components such as an active material, a conductive agent, a binder, and a coating film.

Upon measurement, the obtained powder is used as the measurement target, the temperature is raised from room temperature to 900° C. at a rate of 10° C./min, and weight loss is measured. In addition, by simultaneously performing differential scanning calorimetry (DSC), the temperature at which each material is decomposed can be clearly seen. In this way, a mixing ratio of the electrode material is determined.

Next, the true density of the electrode is calculated from the true density of each material constituting the active material-containing layer and the mixing ratio thereof.

The electrode density is calculated as mass per unit volume of the active material-containing layer. The volume to be considered is, for example, a volume occupied by the electrode material itself, a volume of closed pores in the electrode material, a volume of concave and convex portions on the surface of the electrode material, a volume of a space between the electrode material and another electrode material, and a volume of a space between the electrode material and the current collector.

The electrode density can be calculated from a thickness of the electrode as seen from a caliper or a digital film thickness meter and a weight measured with an electronic balance or the like.

The electrode density can be adjusted by, for example, changing a press pressure (linear pressure) at the time of manufacturing the electrode.

The density of the negative electrode is, for example, within a range of 1.9 g/cm$^3$ to 2.8 g/cm$^3$, and preferably 2.1 g/cm$^3$ to 2.5 g/cm$^3$.

The water content of the negative electrode active material-containing layer is within a range of 0.01 g/cm$^3$ to 0.4 g/cm$^3$. When the water content is within this range, electrolysis of water can be suppressed because the content of water coming into contact with the negative electrode active material particles is small. The water content of the negative electrode active material-containing layer is preferably as small as possible. The water content of the negative electrode active material-containing layer is preferably within a range of 0.02 g/cm$^3$ to 0.22 g/cm$^3$, and more preferably 0.06 g/cm$^3$ to 0.15 g/cm$^3$.

A method of measuring the water content of the negative electrode active material-containing layer will be described.

The electrode is extracted from the battery and an electrode piece having a size of 3 mm×2 cm is prepared. Drying the prepared electrode piece should be avoided until the water content is measured. Specifically, for example, after the electrode pieces are prepared, the electrode pieces are stored in a sealed container and taken to a measuring device. Alternatively, the electrode is disassembled at a place where the measuring device is located, and measurement is performed at that place.

For the sample prepared as described above, the water content is measured by a coulometric titration method using a Karl Fischer moisture meter (model VA-06, manufactured by Mitsubishi Chemical Analytech). Specifically, the measurement is performed under the condition that the sample is heated to 140° C. and nitrogen gas is introduced at a flow rate of 200 ml/min. The content of water is converted from the amount of electricity consumed in the reaction between water and iodine.

Examples of the negative electrode active material include at least one of titanium-containing oxides such as titanium oxide, lithium titanium oxide, niobium titanium oxide, and sodium niobium oxide. The Li insertion potential of the titanium-containing oxide preferably ranges from 1.2 V (vs. Li/Li$^+$) to 2.0 V (vs. Li/Li$^+$). The negative electrode active material can include at least one of the titanium-containing oxides.

The titanium oxide includes, for example, titanium oxide having a monoclinic structure, titanium oxide having a rutile structure, and titanium oxide having an anatase structure. In the titanium oxide of each crystal structure, a composition before charge can be represented by TiO$_2$, and a composition after charge can be represented by Li$_x$TiO$_2$ (0≤x≤1). In addition, the structure of the titanium oxide having the monoclinic structure before charge can be represented by TiO$_2$(B).

The lithium-titanium oxide includes, for example, a lithium-titanium oxide having a spinel structure (for example, general formula of Li$_{4+x}$Ti$_5$O$_{12}$ (−1≤x≤3)), orthorhombic titanium oxide (for example, general formula of Li$_{2+a}$M(I)$_{2-b}$Ti$_{6-c}$M(II)$_d$O$_{14+\sigma}$ (0≤a≤6, 0<b<2, 0<c<6, 0<d<6, −0.5≤δ≤0.5, M(I) is at least one element selected from the group consisting of Sr, Ba, Ca, Mg, Na, Cs, and K, and M(II) is at least one element selected from the group consisting of Zr, Sn, V, Nb, Ta, Mo, W, Fe, Co, Mn, Al, Y), lithium-titanium oxide having a ramsdellite structure (for example, Li$_{2+x}$Ti$_3$O$_7$ (−1≤x≤3), Li$_{1+x}$Ti$_2$O$_4$ (0≤x≤1), Li$_{1.1+x}$Ti$_{1.8}$O$_4$ (0≤x≤1), Li$_{1.07+x}$Ti$_{1.86}$O$_4$ (0≤x≤1), Li$_x$TiO$_2$ (0<x≤1)), and the like. In addition, the lithium-titanium oxide may be a lithium-titanium composite oxide in which dopants are introduced.

The niobium-titanium oxide includes, for example, a material represented by Li$_a$TiM$_b$Nb$_{2±\beta}$O$_{7±\sigma}$ (0≤a≤5, 0≤b≤0.3, 0≤β≤0.3, 0≤σ≤0.3, and M is at least one element selected from the group consisting of Fe, V, Mo, and Ta).

The sodium-niobium-titanium oxide includes, for example, orthorhombic Na-containing niobium-titanium composite oxide represented by general formula of Li$_{2+v}$Na$_{2-w}$M1$_x$Ti$_{6-y-z}$Nb$_y$M2$_z$O$_{14+\delta}$ (0≤v≤4, 0<w<2, 0≤x<2, 0<y<6, 0≤z<3, −0.5≤δ≤0.5, M1 includes at least one selected from Cs, K, Sr, Ba, and Ca, and M2 includes at least one selected from Zr, Sn, V, Ta, Mo, W, Fe, Co, Mn, and Al).

The negative electrode active material is preferably at least one selected from the group consisting of spinel lithium titanate (for example, Li$_4$Ti$_5$O$_{12}$), anatase type titanium oxide (for example, TiO$_2$), niobium-titanium oxide, and sodium-niobium-titanium oxide.

The negative electrode active material is included, for example, in the state of a particle in the negative electrode. The negative electrode active material particles may be individual primary particles, secondary particles in which the primary particles are aggregated, or a mixture of individual primary particles and secondary particles. The shape of the particle is not particularly limited, and may be, for example, a spheroidal, elliptical, flat, or fiber shape, and the like.

An average particle size (diameter) of the secondary particles of the negative electrode active material is preferably larger than 3 μm. The average particle size of the secondary particles is more preferably 5 to 20 μm. Within this range, the surface area of the active material is small and the generation of hydrogen can be suppressed. On the other hand, the average particle size of the primary particles of the negative electrode active material is preferably 1 μm or less. Therefore, high input performance is excellent.

The negative electrode active material-containing layer contains solid electrolyte particles as described above. The ratio of the weight of the solid electrolyte particles to the weight of the negative electrode active material-containing layer is, for example, within a range of 0.01% by weight to 50% by weight, and preferably 0.5% by weight to 10% by weight. When the ratio is excessively high, the volume energy density as the secondary battery is lowered. When the ratio is low and the above-described porosity is satisfied, the ion conductivity as the negative electrode active material-containing layer tends to be poor.

The true density of the solid electrolyte particles is preferably higher than the true density of the negative electrode active material particles. In this case, even if the weight (added amount) of the solid electrolyte particles is small, the porosity of the active material-containing layer can be reduced. Even if the added amount of the solid electrolyte particles is small, the above-described porosity can be satisfied, so that more active material particles can be contained instead. As a result, it is possible to suppress a reduction in volume energy density. In addition, since the above-described porosity can be satisfied, it can be expected that the water content in the active material-containing layer is reduced. The solid electrolyte particles will be described later in detail.

A conductive agent is added in order to increase the current-collecting performance and suppress the contact resistance between the active material and the current collector. Examples of the conductive agent include carbonaceous materials such as vapor grown carbon fiber (VGCF) and carbon black. Examples of the carbon black include acetylene black and graphite. One of these materials may be used as the conductive agent, or two or more of these materials may be combined and used as the conductive agent. Alternatively, instead of using the conductive agent, carbon coating or electron conductive inorganic material coating may be performed on the surfaces of the active material particles.

A binder is added in order to fill a gap between dispersed active materials and bind the active material and the negative electrode current collector. Examples of the binder include polytetrafluoroethylene (PTFE), polyvinylidene fluoride (PVdF), fluorine rubber, styrene butadiene rubber, polyacrylic acid compound, imide compound, carboxymethyl cellulose (CMC), and salts of the CMC. One of these materials may be used as the binder, or two or more of these materials may be combined and used as the binder.

In the compounding ratios of the negative electrode active material, the solid electrolyte, the conductive agent, and the binder in the negative electrode active material-containing layer, the negative electrode active material is preferably within a range of 70% by weight to 95% by weight, the solid electrolyte is preferably within a range of 0.05% by weight to 30% by weight, the conductive agent is preferably within a range of 3% by weight to 18% by weight, and the binder is preferably within a range of 2% by weight to 10% by weight. When the content of the conductive agent is less than 3% by weight, the current-collecting performance of the negative electrode active material layer may be reduced, and the large current performance of the battery may possibly be reduced. In addition, when the content of the binder is less than 2% by weight, the binding property between the negative electrode active material-containing layer and the negative electrode current collector may be reduced, and the cycle performance may possibly be deteriorated. On the other hand, in order to make the capacity higher, it is preferable that the contents of the conductive agent and the binder are respectively 18% by weight or less and 7% by weight or less.

The negative electrode can be produced by, for example, the following method. First, a slurry is prepared by suspending a negative electrode active material, solid electrolyte particles, a conductive agent, and a binder in an appropriate solvent. The slurry is applied to one surface or both surfaces of a negative electrode current collector. Next, the applied slurry is dried to obtain a laminate of the negative electrode active material-containing layer and the negative electrode current collector. After that, the laminate is pressed. In this way, a negative electrode is produced.

Alternatively, the negative electrode may be produced by, for example, the following method. First, a negative electrode active material, solid electrolyte particles, a conductive agent, and a binder are mixed to obtain a mixture. Subsequently, the mixture is formed in pellets. Subsequently, a negative electrode can be obtained by placing the pellets on a negative electrode current collector.

(2) Positive Electrode

The positive electrode includes a positive electrode current collector and a positive electrode active material-containing layer (positive electrode layer) supported on one surface or both surfaces of the positive electrode current collector and containing a positive electrode active material, a conductive agent, and a binder. The positive electrode active material-containing layer may further contain solid electrolyte particles or may not contain solid electrolyte particles.

The positive electrode current collector is formed from, for example, a metal such as stainless steel, Al, Ti, and the like. The positive electrode current collector is in the form of, for example, a foil, a porous body, or a mesh. In order to prevent corrosion of the current collector due to reaction between the current collector and the electrolytic solution, the surface of the current collector may be coated with dopants. It is preferable that the positive electrode current collector is excellent in corrosion resistance and oxidation resistance, like Ti foil or the like.

When the positive electrode active material-containing layer contains solid electrolyte particles, the porosity of the positive electrode active material-containing layer can be increased. In this case, the porosity of the positive electrode active material-containing layer is preferably within a range of 1% to 30%. When the porosity is within a range of 1% to 30%, sufficient lithium ion dispersion in the positive electrode active material-containing layer is possible and the battery can show sufficient performances. When the porosity is lower than 1%, for example, the dispersion resistance of lithium ions may become too high. When the porosity is higher than 30%, the internal resistance in the positive electrode active material-containing layer tends to be high. In addition, the mechanical strength of the electrode tends to be low. The porosity of the positive electrode active material-containing layer is preferably within a range of 10% to 28%, and more preferably 15% to 25%.

The porosity of the positive electrode active material-containing layer can be calculated according to the above-described method of calculating the porosity in terms of the negative electrode.

The water content of the positive electrode active material-containing layer is within a range of 0.01 g/cm$^3$ to 0.4 g/cm$^3$. When the water content is within this range, generation of oxygen can be suppressed because the content of water coming into contact with the positive electrode active material particles is small. The water content of the positive electrode active material-containing layer is preferably as small as possible. The water content of the positive electrode active material-containing layer is preferably within a range of 0.03 g/cm$^3$ to 0.3 g/cm$^3$, and more preferably 0.1 g/cm$^3$ to 0.2 g/cm$^3$.

The water content of the positive electrode active material-containing layer can be calculated according to the above-described method of calculating the water content in terms of the negative electrode.

The density of the positive electrode is, for example, within a range of 2.2 g/cm$^3$ to 3.9 g/cm$^3$, and preferably 2.8 g/cm$^3$ to 3.6 g/cm$^3$.

A substance allowing lithium to be inserted and extracted can be used for the positive electrode active material. The positive electrode may contain one kind of the positive electrode active material or may contain two or more kinds of the positive electrode active material.

Examples of the positive electrode active material may include lithium-manganese composite oxides, lithium-nickel composite oxides, lithium-cobalt composite oxides, lithium-cobalt-aluminum composite oxides, lithium-nickel-cobalt-manganese composite oxides, spinel lithium-manganese-nickel composite oxides, lithium-manganese-cobalt composite oxides, lithium-iron oxide, lithium-iron fluorinated sulfate, and phosphate compounds having an olivine crystal structure (for example, $Li_xFePO_4$ where $0 \leq x \leq 1$, and $Li_xMnPO_4$ where $0 \leq x \leq 1$), and the like. The phosphate compound having the olivine crystal structure has the excellent thermal stability.

Specifically, examples of the positive electrode active material may include lithium manganese composite oxides such as $Li_xMn_2O_4$ and $Li_xMnO_2$, lithium-nickel-aluminum composite oxides such as $Li_xNi_{1-y}Al_yO_2$, lithium-cobalt composite oxides such as $Li_xCoO_2$, lithium-nickel-cobalt composite oxides such as $Li_xNi_{1-y-z}Co_yMn_zO_2$, lithium-manganese-cobalt composite oxides such as $Li_xMn_yCo_{1-y}O_2$, spinel lithium-manganese-nickel composite oxides such as $Li_xMn_{2-y}Ni_yO_4$, lithium-phosphorus oxides having an olivine structure such as $Li_xFePO_4$, $Li_xFe_{1-y}Mn_yPO_4$, or $Li_xCoPO_4$, and iron fluorinated sulfate such as $Li_xFeSO_4F$. x and y are preferably within a range of 0 to 1 unless otherwise specified.

Among them, according to lithium-nickel-aluminum composite oxides, lithium-nickel-cobalt manganese composite oxides, and lithium-manganese-cobalt composite oxides, it is possible to suppress the reaction with the nonaqueous electrolyte in a high temperature environment, and the battery life can be greatly improved. In particular, lithium-nickel-cobalt-manganese composite oxides represented by $Li_xNi_{1-y-z}Co_yMn_zO_2$ ($0 \leq x \leq 1.1$, $0 \leq y \leq 0.5$, $0 \leq z \leq 0.5$) is preferable. By using lithium-nickel-cobalt-manganese composite oxides, higher temperature durability life can be obtained.

The positive electrode active material is included, for example, in the state of particle in the positive electrode. The positive electrode active material particles may be individual primary particles, secondary particles in which the primary particles are aggregated, or a mixture of individual primary particles and secondary particles. The shape of the particle is not particularly limited, and may be, for example, a spheroidal, elliptical, flat, or fiber shape, and the like.

A conductive agent is added in order to increase the current-collecting performance and to suppress the contact resistance between the positive electrode active material and the positive electrode current collector. Examples of the conductive agent include carbonaceous materials such as vapor grown carbon fiber (VGCF) and carbon black. Examples of carbon black include acetylene black and graphite. One of these materials may be used as the conductive agent, or two or more of these materials may be combined and used as the conductive agent. In addition, the conductive agent can be omitted.

A binder is added in order to fill a gap between dispersed positive electrode active materials and to bind the positive electrode active material and the positive electrode current collector. Examples of the binder include polytetrafluoroethylene (PTFE), polyvinylidene fluoride (PVdF), fluorine rubber, styrene butadiene rubber, polyacrylic acid compound, imide compound, carboxyl methyl cellulose (CMC), and salts of the CMC. One of these materials may be used as the binder, or two or more of these materials may be combined and used as the binder.

In the compounding ratios of the positive electrode active material, the solid electrolyte, the conductive agent, and the binder in the positive electrode active material-containing layer, the positive electrode active material is preferably within a range of 80% by weight to 95% by weight, the solid electrolyte is preferably within a range of 0% by weight to 30% by weight, the conductive agent is preferably within a range of 3% by weight to 18% by weight, and the binder is preferably within a range of 2% by weight to 7% by weight. When the content of the conductive agent is 3% by weight or more, the effect described above can be exerted. When the content of the conductive agent is 18% by weight or less, decomposition of the electrolyte on the surface of the conductive agent can be reduced under high temperature preservation. When the content of the binder is 2% by weight or more, sufficient electrode strength can be obtained, and when the content of the binder is 7% by weight or less, the insulating part of the electrode can be reduced.

The positive electrode can be produced by, for example, the following method. First, a slurry is prepared by suspending a positive electrode active material, a conductive agent, and a binder in an appropriate solvent. In a case in which a solid electrolyte is contained in the positive electrode layer, the solid electrolyte particles are dispersed in the slurry. Subsequently, the slurry is coated on one surface or both surfaces of a positive electrode current collector. Subsequently, the applied slurry is dried to obtain a laminate of the positive electrode active material-containing layer and the positive electrode current collector. After that, the laminate is pressed. In this way, a positive electrode is produced.

Alternatively, the positive electrode may be produced by, for example, the following method. First, a positive electrode active material, solid electrolyte particles optionally contained, a conductive agent, and a binder are mixed to obtain a mixture. Subsequently, the mixture is formed in pellets. Subsequently, a positive electrode can be obtained by placing the pellets on a positive electrode current collector.

(3) Separator

The separator is provided for preventing the positive electrode and the negative electrode from coming into contact with each other, and may be arranged between the positive electrode and the negative electrode. Further, the separator having a shape that enables the electrolyte to be movable between the positive electrode and the negative electrode is used.

The separator is made of an insulating material. Specifically, a nonwoven fabric made of a synthetic resin or a porous film containing, for example, polyethylene (PE), polypropylene (PP), cellulose, or polyvinylidene fluoride (PVdF) can be used. The separator preferably has a thickness of 10 μm to 150 μm and a density of 0.2 g/cm$^3$ to 6 g/cm$^3$. When the thickness and the density of the separator are within these ranges, it is possible to provide a secondary battery which is capable of balancing a mechanical strength and reduction in battery resistance in which internal short circuit is suppressed with high power. In addition, heat shrinkage of the separator in a high temperature environment is small, and excellent high temperature storage performance can be exhibited.

The separator may be a solid electrolyte or an ion exchange membrane. As the solid electrolyte, those described in the section of the solid electrolyte to be described later can be used.

The ion exchange membrane is, for example, a cation-exchange membrane with monovalent ion permselectivity. If the cation exchange membrane is used, only alkali metal ions selectively permeate through the ion exchange membrane. Other ions contained in the aqueous electrolyte, for example, anionic species, do not permeate through the cation-exchange membrane.

(4) Solid Electrolyte

The solid electrolyte has lithium ion conductivity. The solid electrolyte preferably have a lithium ion conductivity of $1 \times 10^{-10}$ S/cm or more at 25° C. The lithium ion conductivity of the solid electrolyte is more preferably $1 \times 10^{-6}$ S/cm or more. The solid electrolyte is, for example, particles represented by the following composition formula.

The solid electrolyte particle is preferably, for example, an inorganic compound represented by $LiM_2(PO_4)_3$ having a NASICON skeleton (M is at least one material selected from Ti, Ge, Sr, Zr, Sn, and Al). Among them, $Li_{1+x}Al_xGe_{2-x}(PO_4)_3$, $Li_{1+x}Al_xZr_{2-x}(PO_4)_3$, and $Li_{1+x}Al_xTi_{2-x}(PO_4)_3$ are preferable because of their high ion conductivity and high electrochemical stability to water. In the above materials, x is preferably within a range of 0 to 0.5.

The lithium ion conductivity at 25° C. of the inorganic compound represented by $LiM_2(PO_4)_3$ having a NASICON skeleton is, for example, within a range of $1 \times 10^{-3}$ S/cm to $1 \times 10^{-5}$ S/cm.

Another example of the solid electrolyte particle includes an oxide such as amorphous LIPON ($Li_{2.9}PO_{3.3}N_{0.46}$) and garnet type LLZ ($Li_7La_3Zr_2O_{12}$) The lithium ion conductivity of LIPON ($Li_{2.9}PO_{3.3}N_{0.46}$) at 25° C. is $3 \times 10^{-6}$ S/cm. The lithium ion conductivity of garnet type LLZ ($Li_7La_3Zr_2O_{12}$) at 25° C. is $3 \times 10^{-4}$ S/cm.

Examples of the oxide having the garnet structure are $Li_{5+x}A_yLa_{3-y}M_2O_{12}$ (A is at least one selected from the group consisting of Ca, Sr, and Ba, and M is at least one selected from the group consisting of Nb and Ta), $Li_3M_{2-x}Zr_2O_{12}$ (M is at least one material selected from the group consisting of Ta and Nb), $Li_{7-3x}Al_xLa_3Zr_3O_{12}$, and $Li_7La_3Zr_2O_{12}$. In the above materials, x is, for example, $0 \leq x < 0.8$, and preferably $0 \leq x \leq 0.5$. y is, for example, $0 \leq y < 2$. The oxide having the garnet structure may contain one of these compounds or may contain a mixture of at least two of these compounds. Among them, $Li_{6.25}Al_{0.25}La_3Zr_3O_{12}$ and $Li_7La_3Zr_2O_{12}$ have high ion conductivity and are electrochemically stable, and thus have excellent discharge performance and cycle life performance.

The solid electrolyte particle may include only one of the compounds or may include a mixture of at least two of the compounds.

The solid electrolyte particle may include a polymeric solid electrolyte particle. The solid electrolyte particle may be a polymeric solid electrolyte particle. The polymeric solid electrolyte particle includes, for example, an organic compound having lithium ion conductivity and electrolyte salt. Since such an organic compound also functions as a binder in the active material-containing layer, the solid electrolyte particle preferably includes a polymeric solid electrolyte particle. The polymeric solid electrolyte particle may further include a solvent such as an organic solvent.

Examples of the polymeric material as the organic compound include a polyether-based material, a polyester-based material, a polyamine-based material, a polyethylene-based material, and a polysulfide-based material.

Examples of the electrolyte salt include alkali metal salt such as lithium salt and sodium salt. As the lithium salt and the sodium salt, those similar to the electrolyte salt contained in the aqueous electrolyte to be described later can be used. The polymeric solid electrolyte may contain one kind of the electrolyte salt or may contain two or more kinds of the electrolyte salt.

The average particle size of the solid electrolyte particles is, for example, 0.05 μm to 10 μm.

The average particle size of the solid electrolyte particles can be measured by a Scanning Electron Microscope (SEM).

(5) Aqueous Electrolyte

The aqueous electrolyte contains, for example, a water-containing solvent, and lithium salt or sodium salt as electrolyte salt. The aqueous electrolyte is, for example, an electrolytic solution containing lithium ions or sodium ions. The aqueous electrolyte may contain both lithium ions and sodium ions. The aqueous electrolyte may be a gel aqueous electrolyte in which an aqueous electrolytic solution and a polymeric material are combined. Examples of the polymeric material include polyvinylidene fluoride (PVdF), polyacrylonitrile (PAN), and polyethylene oxide (PEO).

The water-containing solvent may be pure water, or may be a mixed solution and/or a mixed solvent of water and a material other than water.

The aqueous electrolyte preferably contains 1 mol or more of water with respect to 1 mol of electrolyte salt that is a solute. The amount of the water with respect to 1 mol of electrolyte salt is preferably 3.5 mol or more.

That the aqueous electrolyte contains water can be confirmed by GC-MS (Gas Chromatography—Mass Spectrometry). In addition, the salt concentration and the water content in the aqueous electrolyte can be measured by, for example, ICP (Inductively Coupled Plasma) emission spectrometry. The molar concentration (mol/L) can be calculated by measuring a predetermined amount of aqueous electrolyte and calculating the concentration of contained salt. In addition, the number of moles of the solute and the solvent can be calculated by measuring the specific gravity of the aqueous electrolyte.

The aqueous electrolyte is prepared by, for example, dissolving electrolyte salt in an aqueous solvent containing water at a concentration of 1 to 12 mol/L. Even if the concentration of the electrolyte salt in the aqueous electrolyte is changed, the water content of each electrode does not change substantially.

In order to suppress the electrolysis of the aqueous electrolyte, LiOH, $Li_2SO_4$, or the like can be added to adjust pH. pH is preferably 3 to 13, more preferably 4 to 12.

Examples of the lithium salt include LiCl, LiBr, LiOH, $Li_2SO_4$, $LiNO_3$, $LiN(SO_2CF_3)_2$ (LiTFSI: lithium bis(trifluoromethanesulfonyl)imide), $LiN(SO_2F)_2$ (LiFSI: lithium bis(fluorosulfonyl)imide), and $LiB[(OCO)_2]_2$ (LiBOB: lithium bis(oxalate)borate). The kind of the lithium salt used may be one kind or may be two or more kinds. In addition, the aqueous electrolyte may contain salts other than the lithium salt. An example of the salts other than the lithium salt is $ZnSO_4$.

Examples of the sodium salt include NaCl, $Na_2SO_4$, NaOH, $NaNO_3$, NaTFSA (sodium trifluoromethanesulfonylamide), and the like. The kind of the sodium salt used may be one kind or two or more kinds.

Examples of the inorganic anion species include a chloride ion ($Cl^-$), a bromide ion ($Br^-$), a hydroxide ion ($OH^-$), a sulfate ion ($SO_4^{2-}$), and a nitrate ion ($NO_3^-$).

Examples of the organic anion species include an acetate ion, a bis(trifluoromethanesulfonyl)imide ion ($N(SO_2CF_3)_2^-$), a bis(fluorosulfonyl)imide ion ($N(SO_2F)_2^-$), and a bis oxalate borate ion ($B[(OCO)_2]_2^-$). The aqueous electrolyte may include one kind of anion species or two or more kinds of anion species.

(6) Container Member

A metal container, a container formed from a laminate film, or a resin container formed from polyethylene, polypropylene, or the like can be used as the container member which houses the electrode group.

As the metal container, a metal can which is made of nickel, iron or stainless steel and has a rectangular or cylindrical shape may be used.

The plate thickness of each of the resin container and the metal container is preferably from 0.05 mm to 1 mm. The plate thickness is more preferably 0.5 mm or less and still more preferably 0.3 mm or less.

Examples of the laminate film include a multilayer film formed by covering a metal layer with a resin layer. Examples of the metal layer include a stainless steel foil, an aluminum foil, and an aluminum alloy foil. As the resin layer, a polymer such as polypropylene (PP), polyethylene (PE), nylon or polyethylene terephthalate (PET) may be used. The thickness of the laminate film is preferably from 0.01 mm to 0.5 mm and more preferably 0.2 mm or less.

The secondary battery according to the embodiment may have various shapes such as a rectangular shape, a cylindrical shape, a flat shape, a thin shape, and a coin shapes.

(7) Negative Electrode Terminal

The negative electrode terminal can be formed from a material that is electrochemically stable at the potentials of lithium insertion/extraction of the negative active material and has a conductive property. Specifically, the material for the negative electrode terminal may contain zinc, copper, nickel, stainless steel or aluminum, or an aluminum alloy containing at least one element selected from Mg, Ti, Zn, Mn, Fe, Cu, and Si. As the material for the negative electrode terminal, zinc or a zinc alloy is preferably used. In order to reduce the contact resistance between the negative electrode terminal and the negative electrode current collector, the negative electrode terminal is preferably made of the same material as that of the negative electrode current collector.

(8) Positive Electrode Terminal

The positive electrode terminal is made of a material that is electrically stable in a potential range of 3 V to 4.5 V with respect to oxidation-reduction potential of lithium (vs. $Li/Li^+$) and has a conductive property. Examples of the material for the positive electrode terminal include titanium, aluminum, or an aluminum alloy containing at least one element selected from Mg, Ti, Zn, Mn, Fe, Cu, and Si. In order to reduce the contact resistance between the positive electrode terminal and the positive electrode current collector, the positive electrode terminal is preferably made of the same material as that of the positive electrode current collector.

Next, the secondary battery according to the embodiment will be described in detail with reference to the drawings.

Figure 2:
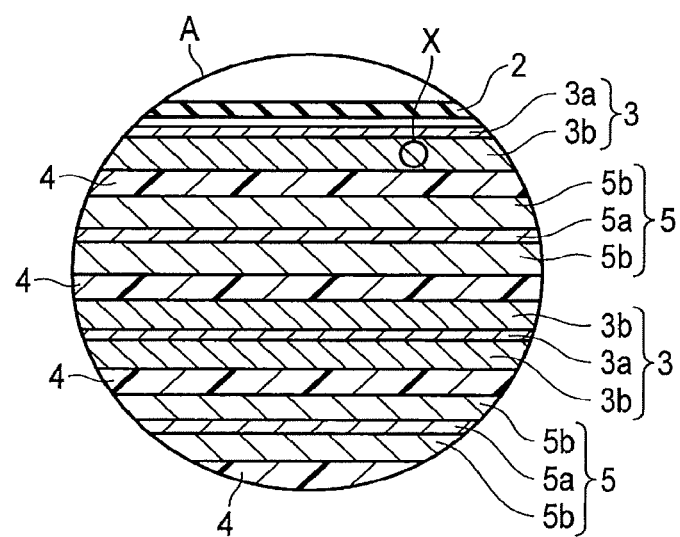
FIG. 2 is an enlarged sectional view of a portion A of the secondary battery shown in FIG. 1.

FIG. 1 is a sectional view schematically showing an example of a secondary battery according to an embodiment. FIG. 2 is an enlarged sectional view of a portion A of the secondary battery shown in FIG. 1.

The secondary battery 100 shown in FIG. 1 and FIG. 2 includes a bag-shaped container member 2 shown in FIG. 1, an electrode group 1 shown in FIG. 1 and FIG. 2, and an aqueous electrolyte (not shown). The electrode group 1 and the aqueous electrolyte are stored in the bag-shaped container member 2. The aqueous electrolyte (not shown) is held in the electrode group 1.

The bag-shaped container member 2 is formed from a laminate film including two resin layers and a metal layer disposed therebetween.

As shown in FIG. 1, the electrode group 1 is a flat wound electrode group. The electrode group 1 includes negative electrodes 3, separators 4, and positive electrodes 5 as shown in FIG. 2. The separator 4 is disposed between the negative electrode 3 and the positive electrode 5.

The negative electrode 3 includes a negative electrode current collector 3a and negative electrode active material-containing layers 3b. In the portion of the negative electrode 3 located at the outermost shell of the wound electrode group 1, the negative electrode active material-containing layer 3b is formed only on the inside surface side of the negative electrode current collector 3a, as shown in FIG. 2. In another portion of the negative electrode 3, the negative electrode active material-containing layer 3b is formed on both sides of the negative electrode current collector 3a.

The positive electrode 5 includes a positive electrode current collector 5a and positive electrode active material-containing layers 5b formed on both sides thereof.

As shown in FIG. 1, a negative electrode terminal 6 and a positive electrode terminal 7 are positioned near the outer end of the wound electrode group 1. The negative electrode terminal 6 is connected to the outermost part of the negative electrode current collector 3a. In addition, the positive electrode terminal 7 is connected to the outermost part of the positive electrode current collector 5a. The negative electrode terminal 6 and the positive electrode terminal 7 extend outward from opening portions of the bag-shaped container member 2. A thermoplastic resin layer is provided on the inner surface of the bag-shaped container member 2, and the openings are closed by thermal fusion bonding of the thermoplastic resin layer.

Figure 3:
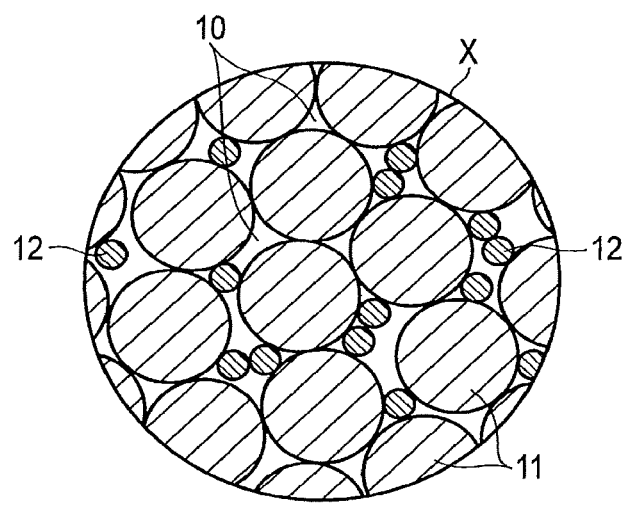
FIG. 3 is an enlarged sectional view of a portion X of a negative electrode active material-containing layer shown in FIG. 2.

FIG. 3 is an enlarged sectional view showing a portion X of the negative electrode active material-containing layer 3b shown in FIG. 2; The negative electrode active material-containing layer 3b contains negative electrode active material particles 11 and solid electrolyte particles 12. In FIG. 3, the conductive agent and the binder are not shown.

The negative electrode active material particles 11 and the solid electrolyte particles 12 are dispersed in the negative electrode active material-containing layer 3b. Voids 10 are formed when plural of electrode materials such as the negative electrode active material particles 11 and the solid electrolyte particles 12 three-dimensionally approach. As shown in FIG. 3, for example, the negative electrode active material particles 11 have a larger average particle size than the solid electrolyte particles 12.

Figure 4:
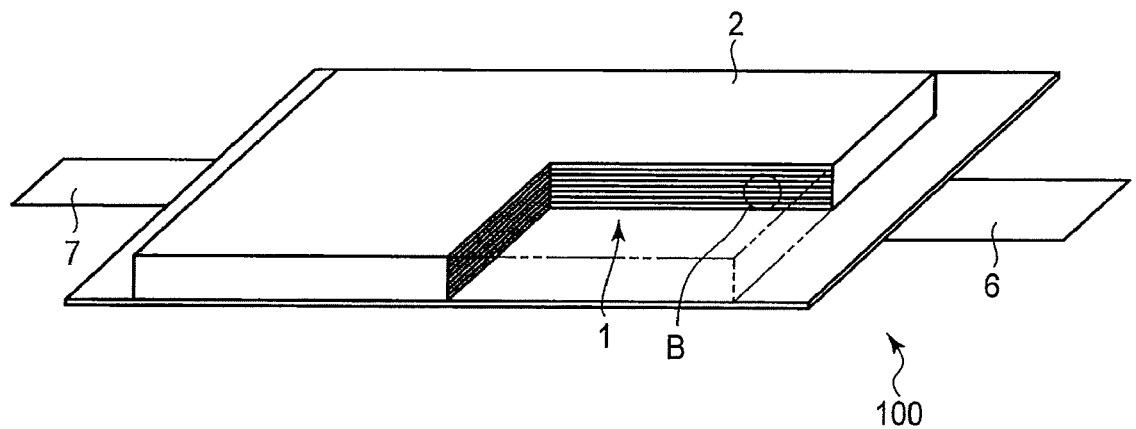
FIG. 4 is a partial cut-away sectional perspective view schematically showing another example of the secondary battery according to the first embodiment.
Figure 5:
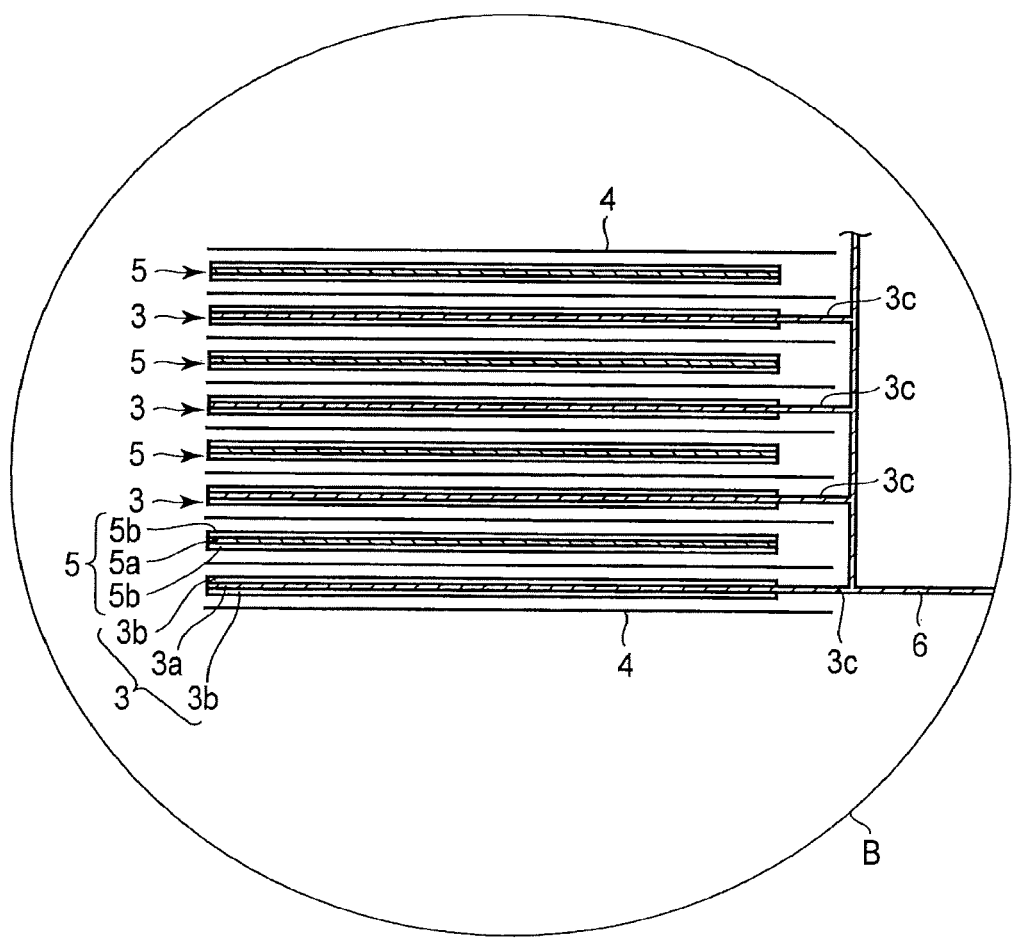
FIG. 5 is an enlarged sectional view of a portion B of the secondary battery shown in FIG. 4.

The secondary battery according to the embodiment is not limited to the secondary battery having the structure shown in FIGS. 1 to 3, and may be, for example, a battery having a structure shown in FIGS. 4 and 5.

FIG. 4 is a partial cut-away sectional perspective view schematically showing another example of the secondary battery according to the embodiment. FIG. 5 is an enlarged sectional view of a portion B of the secondary battery shown in FIG. 4.

The secondary battery 100 shown in FIGS. 4 and 5 includes an electrode group 1 shown in FIGS. 4 and 5, a container member 2 shown in FIG. 4, and an aqueous electrolyte (not shown). The electrode group 1 and the aqueous electrolyte are stored in the container member 2. The aqueous electrolyte is held in the electrode group 1.

The container member 2 is made of a laminate film including two resin layers and a metal layer intervening therebetween.

The electrode group 1 shown in FIG. 5 is a laminated electrode group. The laminated electrode group 1 has a structure in which a negative electrode 3 and a positive electrode 5 are alternately laminated with a separator 4 intervening therebetween.

The electrode group 1 includes plural of negative electrodes 3. Each of the negative electrodes 3 includes a negative electrode current collector 3a and a negative electrode active material-containing layer 3b carried on both surfaces of the negative electrode current collector 3a. In addition, the electrode group 1 includes plural of positive electrodes 5. Each of the positive electrodes 5 includes a positive electrode current collector 5a and a positive electrode active material-containing layer 5b carried on both surfaces of the positive electrode current collector 5a.

The negative electrode current collector 3a of each negative electrode 3 includes a portion 3c on one side where the negative electrode active material-containing layer 3b is not carried on any surfaces. This portion 3c acts as a negative electrode current collector tab. As shown in FIG. 5, the portion 3c acting as the negative electrode current collector tab does not overlap the positive electrode 5. In addition, plural of negative electrode current collector tabs (portion 3c) are electrically connected to the belt-shaped negative electrode terminal 6. A tip of the belt-shaped negative electrode terminal 6 is drawn outward from the container member 2.

In addition, although not shown, the positive electrode current collector 5a of each positive electrode 5 includes a portion on one side where the positive electrode active material-containing layer 5b is not carried on any surfaces. This portion acts as a positive electrode tab. Like the negative electrode tab (portion 3c), the positive electrode tab does not overlap the negative electrode 3. In addition, the positive electrode tab is positioned on the opposite side of the electrode group 1 with respect to the negative electrode tab (portion 3c). The positive electrode tab is electrically connected to the belt-shaped positive electrode terminal 7. A tip of the belt-shaped positive electrode terminal 7 is positioned on the opposite side to the negative electrode terminal 6 and is drawn outward from the container member 2.

The secondary battery according to the embodiment may constitute a battery module. The battery module may include plural of secondary batteries according to the embodiment.

In the battery module according to the embodiment, individual unit cells may be electrically connected in series or in parallel, or may be arranged in combination of series connection and parallel connection.

An example of the battery module according to the embodiment will be described with reference to the drawings.

Figure 6:
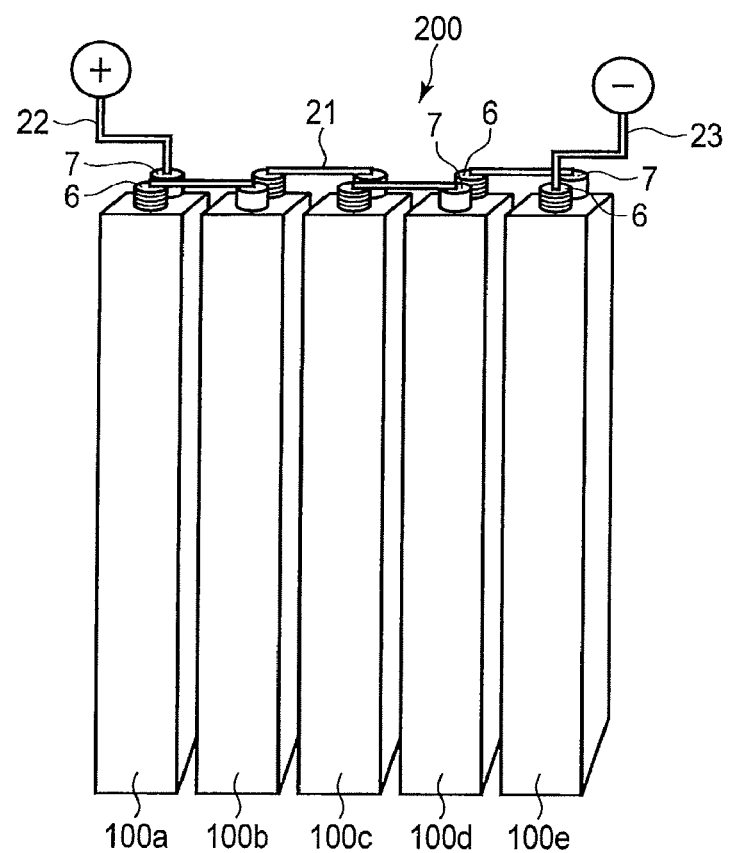
FIG. 6 is a perspective view schematically showing an example of a battery module according to the first embodiment.

FIG. 6 is a perspective view schematically showing an example of the battery module according to the embodiment. The battery module 200 shown in FIG. 6 includes five unit cells 100a to 100e, four bus bars 21, a positive electrode-side lead 22, and a negative electrode-side lead 23. Each of the five unit cells 100a to 100e is the secondary battery according to the embodiment.

The bus bar 21 connects, for example, a negative electrode terminal 6 of one unit cell 100a and a positive electrode terminal 7 of the unit cell 100b positioned adjacent to the unit cell 100a. In this way, the five unit cells 100a to 100e are connected in series by the four bus bars 21. That is, the battery module 200 shown in FIG. 6 is a battery module of five in-series connection.

As shown in FIG. 6, the positive electrode terminal 7 of the unit cell 100a located at one end on the left among the five unit cells 100a to 100e is connected to the positive electrode-side lead 22 for external connection. In addition, the negative electrode terminal 6 of the unit cell 100e located at one end on the right among the five unit cells 100a to 100e is connected to the negative electrode-side lead 23 for external connection.

The secondary battery according to the first embodiment includes a positive electrode, an aqueous electrolyte, a separator, and a negative electrode including a negative electrode active material-containing layer. The negative electrode active material-containing layer includes negative electrode active material particles and solid electrolyte particles having lithium ion conductivity. The porosity of the negative electrode active material-containing layer is within a range of 0.1% to 28%. The water content of the negative electrode active material-containing layer is within a range of 0.01 $g/cm^3$ to 0.4 $g/cm^3$. Therefore, the secondary battery according to the first embodiment is excellent in charge-and-discharge property, preservation characteristic, and cycle life performance.

Second Embodiment

According to a second embodiment, a battery pack is provided. The battery pack includes the secondary battery according to the first embodiment. The battery pack includes one secondary battery according to the first embodiment, or may include a battery module with plural of secondary batteries.

The battery pack according to the embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the embodiment may further comprise an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of a motive force of vehicles such as automobiles) is provided to the battery pack via the external power distribution terminal.

Next, an example of a battery pack according to the embodiment will be described with reference to the drawings.

Figure 7:
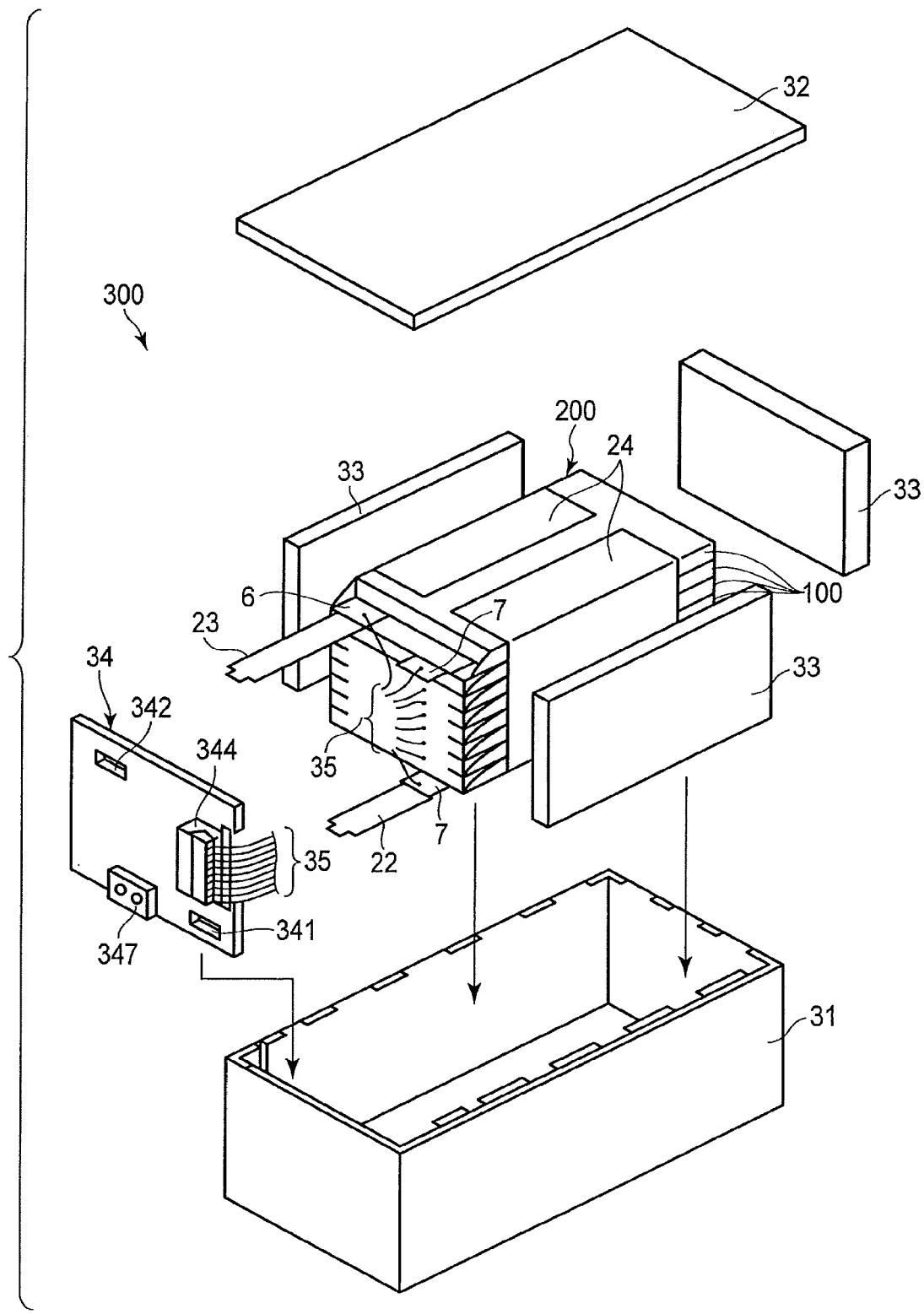
FIG. 7 is a perspective view schematically showing an example of a battery pack according to the second embodiment.

FIG. 7 is an exploded perspective view schematically showing an example of the battery pack according to the embodiment. FIG. 8 is a block diagram showing an example of an electric circuit of the battery pack shown in FIG. 7.

A battery pack 300 shown in FIGS. 7 and 8 includes a housing container 31, a lid 32, protective sheets 33, a battery module 200, a printed wiring board 34, wires 35, and an insulating plate (not shown).

A housing container 31 shown in FIG. 7 is a bottomed-square-shaped container having a rectangular bottom surface. The housing container 31 is configured to house protective sheet 33, a battery module 200, a printed wiring board 34, and wires 35. A lid 32 has a rectangular shape. The lid 32 covers the housing container 31 to house the battery module 200 and the like. Although not shown, opening(s) or connection terminal(s) for connecting to external device(s) and the like are provided on the housing container 31 and lid 32.

The battery module 200 includes plural battery cells 100, a positive electrode-side lead 22, a negative electrode-side lead 23, and an adhesive tape 24.

The battery cell 100 has, for example, a structure shown in FIGS. 1 and 2. At least one of the plural battery cells 100 is a secondary battery according to the first embodiment. The plural battery cells 100 are stacked such that the negative electrode terminals 6 and the positive electrode terminals 7, which extend outside, are directed toward the same direction. The plural battery cells 100 are electrically connected in series, as shown in FIG. 8. The plural battery cells 100 may alternatively be electrically connected in parallel, or connected in a combination of in-series connection and in-parallel connection. If the plural battery cells 100 are connected in parallel, the battery capacity increases as compared to a case in which they are connected in series.

The adhesive tape 24 fastens the plural battery cells 100. The plural battery cells 100 may be fixed using a heat-shrinkable tape in place of the adhesive tape 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural battery cells 100.

One end of the positive electrode-side lead 22 is connected to the positive electrode terminal 7 of the battery cell 100 located lowermost in the stack of the battery cells 100. One end of the negative electrode-side lead 23 is connected to the negative electrode terminal 6 of the battery cell 100 located uppermost in the stack of the battery cells 100.

The printed wiring board 34 is arranged on the inner surface of the housing container 31 along the short side direction. The printed wiring board 34 includes a positive electrode-side connector 341, a negative electrode-side connector 342, a thermistor 343, a protective circuit 344, wirings 345 and 346, an external power distribution terminal 347, a plus-side (positive-side) wire 348a, and a minus-side (negative-side) wire 348b. One principal surface of the printed wiring board 34 faces the surface of the battery module 200 from which the negative electrode terminals 6 and the positive electrode terminals 7 extend out. An insulating plate (not shown) is disposed in between the printed wiring board 34 and the battery module 200.

The positive electrode-side connector 341 is provided with a through hole. By inserting the other end of the positive electrode-side lead 22 into the though hole, the positive electrode-side connector 341 and the positive electrode-side lead 22 become electrically connected. The negative electrode-side connector 342 is provided with a through hole. By inserting the other end of the negative electrode-side lead 23 into the though hole, the negative electrode-side connector 342 and the negative electrode-side lead 23 become electrically connected.

The thermistor 343 is fixed to one principal surface of the printed wiring board 34. The thermistor 343 detects the temperature of each battery cell 100 and transmits detection signals to the protective circuit 344.

The external power distribution terminal 347 is fixed to the other principal surface of the printed wiring board 34.

The external power distribution terminal 347 is electrically connected to device(s) that exists outside the battery pack 300.

The protective circuit 344 is fixed to the other principal surface of the printed wiring board 34. The protective circuit 344 is connected to the external power distribution terminal 347 via the plus-side wire 348a. The protective circuit 344 is connected to the external power distribution terminal 347 via the minus-side wire 348b. In addition, the protective circuit 344 is electrically connected to the positive electrode-side connector 341 via the wiring 345. The protective circuit 344 is electrically connected to the negative electrode-side connector 342 via the wiring 346. Furthermore, the protective circuit 344 is electrically connected to each of the plural battery cells 100 via the wires 35.

The protective sheets 33 are arranged on both inner surfaces of the housing container 31 along the long side direction and on one inner surface of the housing container 31 along the short side direction facing the printed wiring board 34 through the battery module 200. The protective sheet 33 is made of, for example, resin or rubber.

The protective circuit 344 controls charge and discharge of the plural battery cells 100. The protective circuit 344 is also configured to cut-off electric connection between the protective circuit 344 and the external power distribution terminal 347, based on detection signals transmitted from the thermistor 343 or detection signals transmitted from each battery cell 100 or the battery module 200.

An example of the detection signal transmitted from the thermistor 343 is a signal indicating that the temperature of the battery cell(s) 100 is detected to be a predetermined temperature or more. An example of the detection signal transmitted from each battery cell 100 or the battery module 200 is a signal indicating detection of over-charge, over-discharge, and overcurrent of the battery cell(s) 100. When detecting over-charge or the like for each of the battery cells 100, the battery voltage may be detected, or a positive electrode potential or negative electrode potential may be detected. In the latter case, a lithium electrode to be used as a reference electrode may be inserted into each battery cell 100.

Note, that as the protective circuit 344, a circuit included in a device (for example, an electronic device or an automobile) that uses the battery pack 300 as a power source may be used.

As described above, the battery pack 300 includes the external power distribution terminal 347. Hence, the battery pack 300 can output current from the battery module 200 to an external device and input current from an external device to the battery module 200 via the external power distribution terminal 347. In other words, when using the battery pack 300 as a power source, the current from the battery module 200 is supplied to an external device via the external power distribution terminal 347. When charging the battery pack 300, a charge current from an external device is supplied to the battery pack 300 via the external power distribution terminal 347. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may be used as the external power distribution terminal.

Such a battery pack is used for, for example, an application required to have the excellent cycle performance when a large current is taken out. More specifically, the battery pack is used as, for example, a power source for electronic devices, a stationary battery, or an onboard battery for various kinds of vehicles. An example of the electronic device is a digital camera. The battery pack is particularly favorably used as an onboard battery.

The battery pack according to the second embodiment includes the secondary battery according to the first embodiment. Therefore, the battery pack can achieve excellent charge-and-discharge property, preservation characteristic, and cycle life performance.

Third Embodiment

According to a third embodiment, a vehicle is provided. The vehicle is equipped with the battery pack according to the second embodiment.

In a vehicle according to the embodiment, the battery pack is configured, for example, to recover regenerative energy from motive force of the vehicle. The vehicle may include a mechanism configured to convert kinetic energy of the vehicle into regenerative energy.

Examples of the vehicle include two- to four-wheeled hybrid electric automobiles, two- to four-wheeled electric automobiles, electric assist bicycles, and railway cars.

In the vehicle, the installing position of the battery pack is not particularly limited. For example, the battery pack may be installed in the engine compartment of the vehicle, in rear parts of the vehicle, or under seats.

The vehicle may be equipped with plural of battery packs. In such a case, the battery packs may be electrically connected in series, in parallel, or in a combination of in series connection and in parallel connection.

An example of the vehicle according to the embodiment will be described with reference to the drawings.

FIG. 9 is a sectional view schematically showing an example of a vehicle according to the embodiment.

The vehicle 400 shown in FIG. 9 includes a vehicle body 40 and a battery pack 300 according to the second embodiment. The vehicle 400 shown in FIG. 9 is a four-wheel automobile.

This vehicle 400 may have plural battery packs 300 installed. In such a case, the battery packs 300 may be connected in series, connected in parallel, or connected in a combination of in-series connection and in-parallel connection.

In FIG. 9, the battery pack 300 is installed in an engine compartment located at the front of the vehicle body 40. As described above, the battery pack 300 may be installed in rear sections of the vehicle body 40, or under a seat. The battery pack 300 may be used as a power source of the vehicle 400. In addition, the battery pack 300 can recover regenerative energy of a motive force of the vehicle 400.

Figure 10:
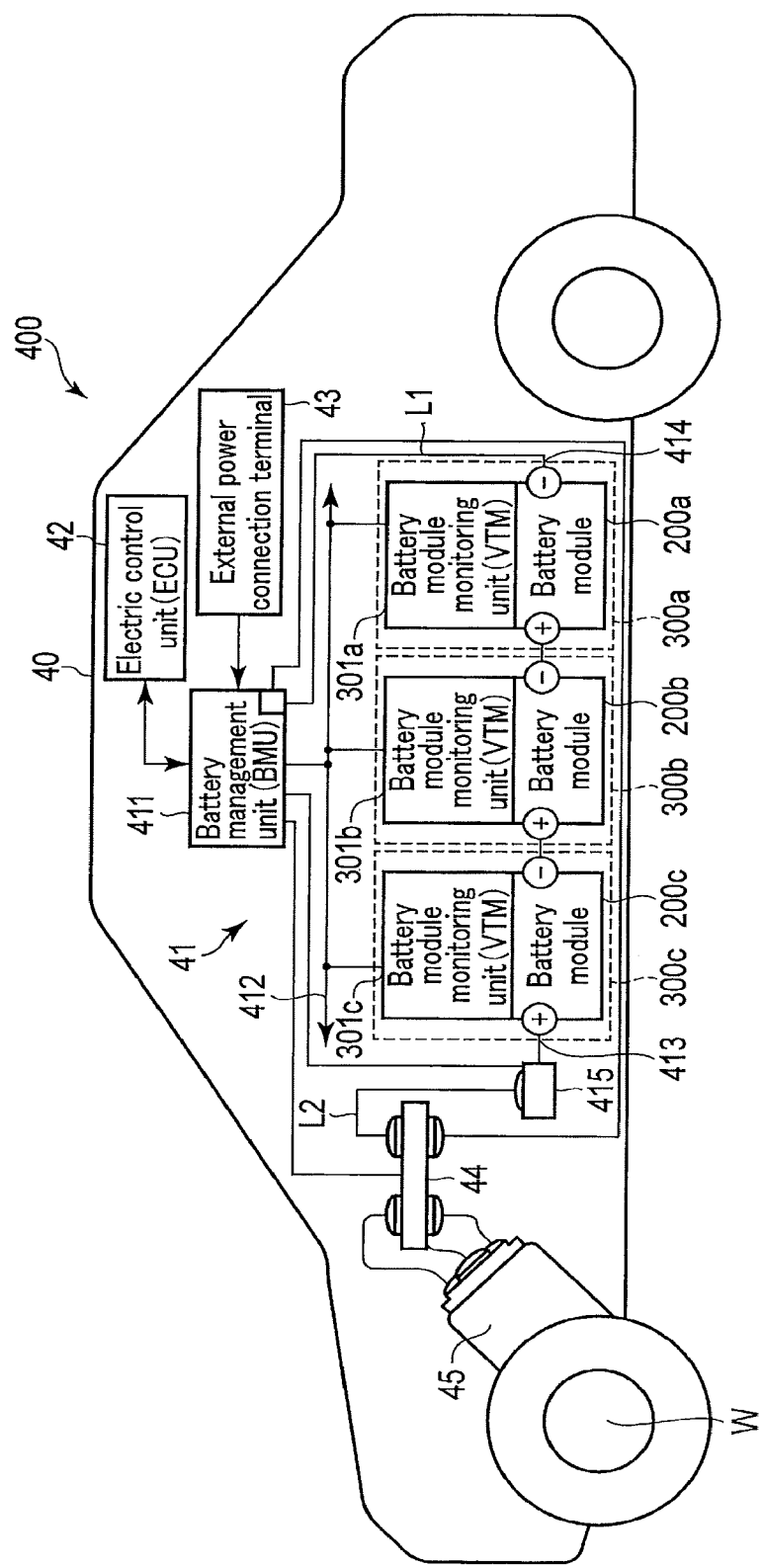
FIG. 10 is a view schematically showing another example of the vehicle according to the third embodiment.

Next, with reference to FIG. 10, an aspect of operation of the vehicle according to the embodiment is explained.

FIG. 10 is a view schematically showing an example of the vehicle according to the embodiment. A vehicle 400, shown in FIG. 10, is an electric automobile.

The vehicle 400, shown in FIG. 10, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 10, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The three battery packs 300a, 300b and 300c are electrically connected in series. The battery pack 300a includes a battery module 200a and a battery module monitoring unit 301a (for example, VTM: voltage temperature monitoring). The battery pack 300b includes a battery module 200b, and a battery module monitoring unit 301b. The battery pack 300c includes a battery module 200c, and a battery module monitoring unit 301c. The battery packs 300a, 300b and 300c can each be independently removed, and may be exchanged by a different battery pack 300.

Each of the battery modules 200a to 200c includes plural battery cells connected in series. At least one of the plural battery cells is the secondary battery according to the first embodiment. The battery modules 200a to 200c each perform charging and discharging via a positive electrode terminal 413 and a negative electrode terminal 414.

In order to collect information concerning security of the vehicle power source 41, the battery management unit 411 performs communication with the battery module monitoring units 301a to 301c and collects information such as voltages or temperatures of the battery cells 100 included in the battery modules 200a to 200c included in the vehicle power source 41.

The communication bus 412 is connected between the battery management unit 411 and the battery module monitoring units 301a to 301c. The communication bus 412 is configured so that multiple nodes (i.e., the battery management unit and one or more battery module monitoring units) share a set of communication lines. The communication bus 412 is, for example, a communication bus configured based on CAN (Control Area Network) standard.

The battery module monitoring units 301a to 301c measure a voltage and a temperature of each battery cell in the battery modules 200a to 200c based on commands from the battery management unit 411. It is possible, however, to measure the temperatures only at several points per battery module, and the temperatures of all of the battery cells need not be measured.

The vehicle power source 41 may also have an electromagnetic contactor (for example, a switch unit 415 shown in FIG. 10) for switching connection between the positive electrode terminal 413 and the negative electrode terminal 414. The switch unit 415 includes a precharge switch (not shown), which is turned on when the battery modules 200a to 200c are charged, and a main switch (not shown), which is turned on when battery output is supplied to a load. The precharge switch and the main switch include a relay circuit (not shown), which is turned on or off based on a signal provided to a coil disposed near a switch element.

The inverter 44 converts an inputted direct current voltage to a three-phase alternate current (AC) high, voltage for driving a motor. Three-phase output terminal(s) of the inverter 44 is (are) connected to each three-phase input terminal of the drive motor 45. The inverter 44 controls an output voltage based on control signals from the battery management unit 411 or the vehicle ECU 41, which controls the entire operation of the vehicle.

The drive motor 45 is rotated by electric power supplied from the inverter 44. The rotation is transferred to an axle and driving wheels W via a differential gear unit, for example.

The vehicle 400 also includes a regenerative brake mechanism, though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The direct current is inputted, for example, into the battery pack included the vehicle power source 41.

One terminal of a connecting line L1 is connected via a current detector (not shown) in the battery management unit 411 to the negative electrode terminal 414 of the vehicle power source 41. The other terminal of the connecting line L1 is connected to a negative electrode input terminal of the inverter 44.

One terminal of a connecting line L2 is connected via the switch unit 415 to the positive electrode terminal 413 of the vehicle power source 41. The other terminal of the connecting line L2 is connected to a positive electrode input terminal of the inverter 44.

The external terminal 43 is connected to the battery management unit 411. The external terminal 43 is able to connect, for example, to an external power source.

The vehicle ECU 42 cooperatively controls the battery management unit 411 together with other units in response to inputs operated by a driver or the like, thereby performing the management of the whole vehicle. Data concerning the security of the vehicle power source 41, such as a remaining capacity of the vehicle power source 41, are transferred between the battery management unit 411 and the vehicle ECU 42 via communication lines.

The vehicle according to the third embodiment includes the battery pack according to the second embodiment. Therefore, according to this embodiment, it is possible to provide the vehicle equipped with the battery pack capable of achieving excellent charge-and-discharge property, preservation characteristic, and cycle life performance.

EXAMPLES

Examples are explained below, but the embodiments are not limited to Examples described below.

Example 1

<Production of Positive Electrode>

A positive electrode was produced as described below.

Lithium manganese oxide ($LiMn_2O_4$) having a spinel structure with an average particle size of 10 μm was used as a positive electrode active material, a graphite powder was used as a conductive agent, and polyvinylidene fluoride (PVdF) was used as a binder. The positive electrode active material, the conductive agent, and the binder were compounded in a ratio of 80% by weight, 10% by weight, and 10% by weight, respectively, and were dispersed in an N-methyl-2-pyrrolidone (NMP) solvent to prepare a slurry. The prepared slurry was applied on both surfaces of a 12 μm-thick Ti foil as a positive electrode current collector, and the coating film was dried to form a positive electrode current collector and a positive electrode active material-containing layer. This laminate was pressed under a pressure of 18 t/10 cm at a drawing speed of 10 m/min and then dried at 120° C. for 12 hours to prepare a positive electrode having an electrode density of 3.1 g/cm³.

<Production of Negative Electrode>

A negative electrode was produced as described below.

A $Li_4Ti_5O_{12}$ powder having an average secondary particle size (diameter) of 15 μm was used as a negative electrode active material, a LATP ($Li_{1.5}Al_{0.5}Ti_{1.5}(PO_4)_3$) powder having an average particle size (diameter) of 0.4 μm was used as solid electrolyte particles, a graphite powder was used as a conductive agent, and PVdF was used as a binder. The negative electrode active material, the solid electrolyte particles, the conductive agent, and the binder were compounded in a ratio of 70% by weight, 10% by weight, 10% by weight, and 10% by weight, respectively, and were dispersed in an NMP solvent to prepare a slurry. The prepared slurry was applied on a 20 μm-thick Zn foil as a positive electrode current collector, and the coating film was dried to obtain a laminate including a negative electrode current collector and a negative electrode active material-containing layer. This laminate was pressed under a pressure of 18 t/10 cm at a drawing speed of 10 m/min and then dried at 120° C. for 12 hours to prepare a negative electrode having an electrode density of 2.5 g/cm³.

<Production of Electrode Group>

An electrode group was obtained by laminating the positive electrode produced as described above, the synthetic resin woven fabric as the separator, the negative electrode produced as described above in this order. The obtained electrode group was housed in a thin metal can formed from stainless steel having a thickness of 0.25 mm. The metal can had a valve for leaking a gas when the internal pressure became 2 atm or more.

<Production of Secondary Battery and Charge-and-Discharge of First Cycle>

An electrolytic solution in which 12 M (mol/L) LiCl as an electrolyte salt was dissolved in 1 L of water was prepared, and the electrolytic solution was poured into the metal can to produce a secondary battery. The produced secondary battery was left for 24 hours in a 25° C. environment. After that, the battery was charged to 2.8 V at 1 A in a 25° C. environment and was then discharged to 1.6 V to check the capacity of the battery.

<Evaluation of Cycle>

In a 25° C. environment, after the battery was charged to 2.8 V at a constant current of 3 A, a pause time of 30 minutes was provided. Subsequently, the battery was discharged to 1.5 V at a constant current of 3 A, and a pause time of 30 minutes was provided again. A series of these operations was defined as one charge-and-discharge cycle. The charge-and-discharge cycle was repeated 50 times with respect to the produced secondary battery. The capacity at the fiftieth cycle with respect to the initial capacity, and the charge-discharge efficiency (discharge capacity/charge capacity) at the fiftieth cycle were calculated.

<Storage Test>

In a 25° C. environment, after the battery was charged to 2.8 V at a constant current of 3 A, a pause time of 30 minutes was provided. Subsequently, the battery was discharged to 1.5 V at a constant current of 3 A, and a pause time of 30 minutes was provided again. A series of these operations was defined as one charge-and-discharge cycle. The charge-and-discharge cycle was repeated 2 times with respect to the produced secondary battery. An average value of the remaining capacity after the first cycle and the remaining capacity after the second cycle was obtained to calculate the average capacity in two cycles.

After that, the battery was charged again to 2.8 V by a constant current of 3 A, then a rest time of 24 hours was provided, the battery was discharged to 1.5 V by a constant current of 3 A and the remaining capacity was confirmed.

Preservation characteristic was evaluated from the average capacity in two cycles and the remaining capacity after 24 hours according to the following formula.

(Capacity Retention Ratio After 24 Hours)(%)=(Remaining Capacity After 24 Hours)/(Average Capacity in Two Cycles)×100

The above results are shown in Table 1 and Table 2 below. Table 1 and Table 2 show results of Examples 2 to 27 and Comparative Examples 1 to 3 described below. Table 1 also shows the negative electrode water content, the negative electrode porosity, the positive electrode water content, and the positive electrode porosity, which were measured according to the method described in the first embodiment, in the secondary batteries according to Examples and Comparative Examples.

In Table 1, the "positive electrode water content" represents the water content of the positive electrode active material-containing layer. The "positive electrode porosity" represents the porosity of the positive electrode active material-containing layer. The "negative electrode water content" represents the water content of the negative electrode active material-containing layer. The "negative electrode porosity" represents the porosity of the negative electrode active material-containing layer. The "object to be mixed" represents an electrode containing solid electrolyte particles among the positive electrode and the negative electrode. The "solid electrolyte content" represents the ratio of the weight of the solid electrolyte particles to the weight of the active material-containing layer as a percentage. The "capacity retention ratio (after 50 cycles)" represents the capacity at the time of 50 times with respect to the initial capacity as a percentage in the cycle test described above. The "charge-discharge efficiency (after 50 cycles)" represents the charge-and-discharge efficiency (discharge capacity/charge capacity) at the time of 50 times as a percentage in the cycle test described above. The "capacity retention ratio (after 24 hours)" represents the capacity retention ratio after 24 hours as a percentage calculated in the storage test described above.

Example 2

A secondary battery was produced in the same manner as described in Example 1, except that the proportion of solid electrolyte particles mixed at the time of preparing a negative electrode was 0.1% by weight, and the secondary battery was evaluated.

Example 3

A secondary battery was produced in the same manner as described in Example 1, except that the proportion of solid electrolyte particles mixed at the time of preparing a negative electrode was 5% by weight, and the secondary battery was evaluated.

Example 4

A secondary battery was produced in the same manner as described in Example 1, except that the proportion of the solid electrolyte particles mixed at the time of preparing a negative electrode was 20% by weight, and the secondary battery was evaluated.

Example 5

A secondary battery was produced in the same manner as described in Example 1, except that LAGP ($Li_{1.5}Al_{0.5}Ge_{1.5}(PO_4)_3$) having an average particle size of 0.4 μm was used as the solid electrolyte particles to be mixed at the time of preparing the negative electrode, and the secondary battery was evaluated.

Example 6

A secondary battery was produced in the same manner as described in Example 1, except that LLZ ($Li_7La_3Zr_2O_{12}$) having an average particle size of 0.3 μm was used as the solid electrolyte particles to be mixed at the time of preparing the negative electrode, and the secondary battery was evaluated.

Example 7

A secondary battery was produced in the same manner as described in Example 1, except that polymeric solid electrolyte particles containing polyethylene oxide (PEO) and having an average particle size of 0.5 μm were used as the solid electrolyte particles to be mixed at the time of preparing the negative electrode, and the secondary battery was evaluated.

Example 8

A secondary battery was produced in the same manner as described in Example 1, except that $Li_{0.5}La_{0.5}TiO_3$ having an average particle size of 0.5 μm was used as the solid electrolyte particles to be mixed at the time of preparing the negative electrode, and the secondary battery was evaluated.

Example 9

A secondary battery was produced in the same manner as described in Example 1, except that $Li_{3.6}Si_{0.6}PO_4$ having an average particle size of 0.4 μm was used as the solid electrolyte particles to be mixed at the time of preparing the negative electrode, and the secondary battery was evaluated.

Example 10

A secondary battery was produced in the same manner as described in Example 1, except that LIPON ($Li_{2.9}PO_{3.3}N_{0.46}$) having an average particle size of 0.5 μm was used as the solid electrolyte particles to be mixed at the time of preparing the negative electrode, and the secondary battery was evaluated.

Example 11

A secondary battery was produced in the same manner as described in Example 1, except that solid electrolyte particles were also mixed in the positive electrode as described below, and the secondary battery was evaluated.

Lithium manganese oxide ($LiMn_2O_4$) having a spinel structure with an average particle size of 10 μm was used as a positive electrode active material, a LATP ($Li_{1.5}AlTi_{10.5}(PO_4)_3$) powder having an average particle size (diameter) of 0.4 μm was used as solid electrolyte particles, a graphite powder was used as a conductive agent, and polyvinylidene fluoride (PVdF) was used as a binder. The positive electrode active material, the solid electrolyte particles, the conductive agent, and the binder were compounded in a ratio of 70% by weight, 10% by weight, 10% by weight, and 10% by weight, respectively, and were dispersed in an N-methyl-2-pyrrolidone (NMP) solvent to prepare a slurry. The prepared slurry was applied on both surfaces of a 12 μm-thick Ti foil as a positive electrode current collector, and the coating film was dried to form a positive electrode current collector and a positive electrode active material-containing layer. This laminate was pressed to prepare a positive electrode having an electrode density of 3.3 g/cm$^3$.

Example 12

A secondary battery was produced in the same manner as described in Example 1, except that lithium-cobalt oxide (LiCoO$_2$) having an average particle size of 5 μm was used as a positive electrode active material, and the secondary battery was evaluated.

Example 13

A secondary battery was produced in the same manner as described in Example 1, except that lithium iron phosphate (LiFePO$_4$) having an average particle size of 8 μm was used as a positive electrode active material, and the secondary battery was evaluated.

Example 14

A secondary battery was produced in the same manner as described in Example 1, except that titanium oxide (TiO$_2$) having an average particle size of 0.1 μm was used as a negative electrode active material, and the secondary battery was evaluated.

Example 15

A secondary battery was produced in the same manner as described in Example 1, except that a niobium titanium composite oxide (Nb$_2$TiO$_7$) having an average particle size of 2 μm was used as a negative electrode active material, and the secondary battery was evaluated.

Example 16

A secondary battery was produced in the same manner as described in Example 1, except that a sodium-niobium-titanium composite oxide (Li$_2$Na$_{1.8}$Ti$_{5.8}$Nb$_{0.2}$O$_{14}$) having an average particle size of 1 μm was used as a negative electrode active material, and the secondary battery was evaluated.

Example 17

A secondary battery was produced in the same manner as described in Example 1, except that the proportion of solid electrolyte particles mixed at the time of preparing a negative electrode was 30% by weight, and the secondary battery was evaluated.

Example 18

A secondary battery was produced in the same manner as described in Example 1, except that the proportion of solid electrolyte particles mixed at the time of preparing a negative electrode was 50% by weight, and the secondary battery was evaluated.

Example 19

A secondary battery was produced in the same manner as described in Example 1, except that the pressing pressure during the preparation of the negative electrode was changed to a pressure of 15 t/10 cm and the drawing speed was changed to 10 m/min such that the negative electrode density was 2.0 g/cm$^3$, and the secondary battery was evaluated.

Example 20

A secondary battery was produced in the same manner as described in Example 1, except that the pressing pressure during the preparation of the negative electrode was changed to a pressure of 16 t/10 cm and the drawing speed was changed to 10 m/min such that the negative electrode density was 2.1 g/cm$^3$, and the secondary battery was evaluated.

Example 21

A secondary battery was produced in the same manner as described in Example 1, except that the pressing pressure during the preparation of the negative electrode was changed to a pressure of 17 t/10 cm and the drawing speed was changed to 10 m/min such that the negative electrode density was 2.3 g/cm$^3$, and the secondary battery was evaluated.

Example 22

A secondary battery was produced in the same manner as described in Example 1, except that the pressing pressure during the preparation of the negative electrode was changed to a pressure of 21 t/10 cm and the drawing speed was changed to 10 m/min such that the negative electrode density was 2.8 g/cm$^3$, and the secondary battery was evaluated.

Example 23

A secondary battery was produced in the same manner as described in Example 1, except that the pressing pressure during the preparation of the positive electrode was changed to a pressure of 19 t/10 cm and the drawing speed was changed to 10 m/min such that the positive electrode density was 2.6 g/cm$^3$, and the secondary battery was evaluated.

Example 24

A secondary battery was produced in the same manner as described in Example 1, except that an electrolytic solution in which 10.5 M LiCl was dissolved in 1 L of water was used as an electrolytic solution, and the secondary battery was evaluated.

Example 25

A secondary battery was produced in the same manner as described in Example 1, except that an electrolytic solution in which 9 M LiCl was dissolved in 1 L of water was used as an electrolytic solution, and the secondary battery was evaluated.

Example 26

A secondary battery was produced in the same manner as described in Example 1, except that an electrolytic solution in which 7.5 M LiCl was dissolved in 1 L of water was used as an electrolytic solution, and the secondary battery was evaluated.

Example 27

A secondary battery was produced in the same manner as described in Example 1, except that an electrolytic solution in which 6 M LiCl was dissolved in 1 L of water was used as an electrolytic solution, and the secondary battery was evaluated.

Comparative Example 1

A secondary battery was produced in the same manner as described in Example 1, except that solid electrolyte particles were not mixed at the time of preparing the negative electrode, and the secondary battery was evaluated.

Comparative Example 2

A secondary battery was produced in the same manner as described in Example 1, except that 10% by weight of alumina ($Al_2O_3$) having an average particle size of 0.5 µm was compounded instead of the solid electrolyte particles at the time of preparing the slurry of the negative electrode, and the secondary battery was evaluated.

Comparative Example 3

A secondary battery was produced in the same manner as described in Example 1, except that a nonaqueous electrolytic solution in which 1.0 M $LiPF_6$ as electrolyte salt was dissolved in a mixed solvent of polycarbonate and diethyl carbonate (volume ratio: 1:2) used as an electrolytic solution, and the secondary battery was evaluated.

Comparative Example 4

A secondary battery was produced in the same manner as described in Example 1, except that the pressing pressure during the preparation of the negative electrode was changed to a pressure of 13 t/10 cm and the drawing speed was changed to 10 m/min such that the negative electrode density was 1.8 g/cm$^3$, and an electrolytic solution in which 0.1 M LiCl was dissolved in 1 L of water was used as the aqueous electrolyte, and the secondary battery was evaluated.

Comparative Example 5

A secondary battery was produced in the same manner as described in Example 1, except that the pressing pressure during the preparation of the negative electrode was changed to a pressure of 14 t/10 cm and the drawing speed was changed to 10 m/min such that the negative electrode density was 2.0 g/cm$^3$, and an electrolytic solution in which 0.1 M LiCl was dissolved in 1 L of water was used as the aqueous electrolyte, and the secondary battery was evaluated.

TABLE 1

| | Positive Electrode Active Material | Negative Electrode Active Material | Positive Electrode Density (g/cm$^3$) | Positive Electrode Water Content (g/cm$^3$) | Positive Electrode Porosity (%) |
|---|---|---|---|---|---|
| Example 1 | $LiMn_2O_4$ | $Li_4Ti_5O_{12}$ | 3.1 | 0.15 | 20 |
| Example 2 | $LiMn_2O_4$ | $Li_4Ti_5O_{12}$ | 3.1 | 0.15 | 20 |
| Example 3 | $LiMn_2O_4$ | $Li_4Ti_5O_{12}$ | 3.1 | 0.15 | 20 |
| Example 4 | $LiMn_2O_4$ | $Li_4Ti_5O_{12}$ | 3.1 | 0.15 | 20 |
| Example 5 | $LiMn_2O_4$ | $Li_4Ti_5O_{12}$ | 3.1 | 0.15 | 20 |
| Example 6 | $LiMn_2O_4$ | $Li_4Ti_5O_{12}$ | 3.1 | 0.15 | 20 |
| Example 7 | $LiMn_2O_4$ | $Li_4Ti_5O_{12}$ | 3.1 | 0.15 | 20 |
| Example 8 | $LiMn_2O_4$ | $Li_4Ti_5O_{12}$ | 3.1 | 0.15 | 20 |
| Example 9 | $LiMn_2O_4$ | $Li_4Ti_5O_{12}$ | 3.1 | 0.15 | 20 |
| Example 10 | $LiMn_2O_4$ | $Li_4Ti_5O_{12}$ | 3.1 | 0.15 | 20 |
| Example 11 | $LiMn_2O_4$ | $Li_4Ti_5O_{12}$ | 3.3 | 0.05 | 6 |
| Example 12 | $LiCoO_2$ | $Li_4Ti_5O_{12}$ | 3.2 | 0.22 | 29 |
| Example 13 | $LiFePO_4$ | $Li_4Ti_5O_{12}$ | 2.5 | 0.18 | 24 |
| Example 14 | $LiMn_2O_4$ | $TiO_2$ | 3.1 | 0.15 | 20 |
| Example 15 | $LiMn_2O_4$ | $Nb_2TiO_7$ | 3.1 | 0.15 | 20 |
| Example 16 | $LiMn_2O_4$ | $Li_2Na_{1.8}Ti_{5.8}Nb_{0.2}O_{14}$ | 3.1 | 0.15 | 20 |
| Example 17 | $LiMn_2O_4$ | $Li_4Ti_5O_{12}$ | 3.1 | 0.15 | 20 |
| Example 18 | $LiMn_2O_4$ | $Li_4Ti_5O_{12}$ | 3.1 | 0.15 | 20 |
| Example 19 | $LiMn_2O_4$ | $Li_4Ti_5O_{12}$ | 3.1 | 0.15 | 20 |
| Example 20 | $LiMn_2O_4$ | $Li_4Ti_5O_{12}$ | 3.1 | 0.15 | 20 |
| Example 21 | $LiMn_2O_4$ | $Li_4Ti_5O_{12}$ | 3.1 | 0.15 | 20 |
| Example 22 | $LiMn_2O_4$ | $Li_4Ti_5O_{12}$ | 3.1 | 0.15 | 20 |
| Example 23 | $LiMn_2O_4$ | $Li_4Ti_5O_{12}$ | 2.6 | 0.25 | 32 |
| Example 24 | $LiMn_2O_4$ | $Li_4Ti_5O_{12}$ | 3.1 | 0.15 | 20 |
| Example 25 | $LiMn_2O_4$ | $Li_4Ti_5O_{12}$ | 3.1 | 0.15 | 20 |
| Example 26 | $LiMn_2O_4$ | $Li_4Ti_5O_{12}$ | 3.1 | 0.15 | 20 |
| Example 27 | $LiMn_2O_4$ | $Li_4Ti_5O_{12}$ | 3.1 | 0.15 | 20 |
| Comparative Example 1 | $LiMn_2O_4$ | $Li_4Ti_5O_{12}$ | 3.1 | 0.15 | 20 |
| Comparative Example 2 | $LiMn_2O_4$ | $Li_4Ti_5O_{12}$ | 3.1 | 0.15 | 20 |
| Comparative Example 3 | $LiMn_2O_4$ | $Li_4Ti_5O_{12}$ | 3.1 | $5.9 \times 10^{-6}$ | 20 |
| Comparative Example 4 | $LiMn_2O_4$ | $Li_4Ti_5O_{12}$ | 3.1 | 0.15 | 20 |
| Comparative | $LiMn_2O_4$ | $Li_4Ti_5O_{12}$ | 3.1 | 0.15 | 20 |

TABLE 1-continued

Example 5

| | Negative Electrode Density (g/cm³) | Negative Electrode Water Content (g/cm³) | Negative Electrode Porosity (%) | Solid Electrolyte | Object To Be Mixed | Solid Electrolyte Content (wt %) |
|---|---|---|---|---|---|---|
| Example 1 | 2.5 | 0.09 | 12 | $Li_{1.5}Al_{0.5}Ti_{1.5}(PO_4)_3$ | Negative electrode | 10.0 |
| Example 2 | 2.3 | 0.20 | 27 | $Li_{1.5}Al_{0.5}Ti_{1.5}(PO_4)_3$ | Negative electrode | 0.1 |
| Example 3 | 2.4 | 0.14 | 19 | $Li_{1.5}Al_{0.5}Ti_{1.5}(PO_4)_3$ | Negative electrode | 5.0 |
| Example 4 | 2.4 | 0.06 | 8 | $Li_{1.5}Al_{0.5}Ti_{1.5}(PO_4)_3$ | Negative electrode | 20.0 |
| Example 5 | 2.5 | 0.09 | 12 | $Li_{1.5}Al_{0.5}Ge_{1.5}(PO_4)_3$ | Negative electrode | 10.0 |
| Example 6 | 2.5 | 0.09 | 12 | $Li_7La_3Zr_2O_{12}$ | Negative electrode | 10.0 |
| Example 7 | 1.6 | 0.08 | 10 | PEO | Negative electrode | 10.0 |
| Example 8 | 2.5 | 0.09 | 12 | $Li_{0.5}La_{0.5}TiO_3$ | Negative electrode | 10.0 |
| Example 9 | 2.5 | 0.09 | 12 | $Li_{3.6}Si_{0.6}PO_4$ | Negative electrode | 10.0 |
| Example 10 | 1.9 | 0.07 | 11 | LIPON | Negative electrode | 10.0 |
| Example 11 | 2.5 | 0.09 | 12 | $Li_{1.5}Al_{0.5}Ti_{1.5}(PO_4)_3$ | Postive electrode/Negative electrode | 10/10 |
| Example 12 | 2.5 | 0.09 | 12 | $Li_{1.5}Al_{0.5}Ti_{1.5}(PO_4)_3$ | Negative electrode | 10.0 |
| Example 13 | 2.5 | 0.09 | 12 | $Li_{1.5}Al_{0.5}Ti_{1.5}(PO_4)_3$ | Negative electrode | 10.0 |
| Example 14 | 2.7 | 0.09 | 11 | $Li_{1.5}Al_{0.5}Ti_{1.5}(PO_4)_3$ | Negative electrode | 10.0 |
| Example 15 | 3.1 | 0.07 | 9 | $Li_{1.5}Al_{0.5}Ti_{1.5}(PO_4)_3$ | Negative electrode | 10.0 |
| Example 16 | 2.5 | 0.09 | 12 | $Li_{1.5}Al_{0.5}Ti_{1.5}(PO_4)_3$ | Negative electrode | 10.0 |
| Example 17 | 2.4 | 0.02 | 3.1 | $Li_{1.5}Al_{0.5}Ti_{1.5}(PO_4)_3$ | Negative electrode | 30.0 |
| Example 18 | 2.3 | 0.01 | 0.35 | $Li_{1.5}Al_{0.5}Ti_{1.5}(PO_4)_3$ | Negative electrode | 50.0 |
| Example 19 | 2.0 | 0.21 | 27 | $Li_{1.5}Al_{0.5}Ti_{1.5}(PO_4)_3$ | Negative electrode | 10.0 |
| Example 20 | 2.1 | 0.18 | 24 | $Li_{1.5}Al_{0.5}Ti_{1.5}(PO_4)_3$ | Negative electrode | 10.0 |
| Example 21 | 2.3 | 0.14 | 18 | $Li_{1.5}Al_{0.5}Ti_{1.5}(PO_4)_3$ | Negative electrode | 10.0 |
| Example 22 | 2.8 | 0.02 | 2.9 | $Li_{1.5}Al_{0.5}Ti_{1.5}(PO_4)_3$ | Negative electrode | 10.0 |
| Example 23 | 2.5 | 0.09 | 12 | $Li_{1.5}Al_{0.5}Ti_{1.5}(PO_4)_3$ | Negative electrode | 10.0 |
| Example 24 | 2.5 | 0.09 | 12 | $Li_{1.5}Al_{0.5}Ti_{1.5}(PO_4)_3$ | Negative electrode | 10.0 |
| Example 25 | 2.5 | 0.10 | 12 | $Li_{1.5}Al_{0.5}Ti_{1.5}(PO_4)_3$ | Negative electrode | 10.0 |
| Example 26 | 2.5 | 0.10 | 12 | $Li_{1.5}Al_{0.5}Ti_{1.5}(PO_4)_3$ | Negative electrode | 10.0 |
| Example 27 | 2.5 | 0.10 | 12 | $Li_{1.5}Al_{0.5}Ti_{1.5}(PO_4)_3$ | Negative electrode | 10.0 |
| Comparative Example 1 | 2.2 | 0.23 | 30 | — | — | — |
| Comparative Example 2 | 2.5 | 0.09 | 12 | $Al_2O_3$ | Negative electrode | 10.0 |
| Comparative Example 3 | 2.5 | $7.2 \times 10^{-6}$ | 12 | $Li_{1.5}Al_{0.5}Ti_{1.5}(PO_4)_3$ | Negative electrode | 10.0 |
| Comparative Example 4 | 1.8 | 0.43 | 43 | $Li_{1.5}Al_{0.5}Ti_{1.5}(PO_4)_3$ | Negative electrode | 10.0 |
| Comparative Example 5 | 2 | 0.36 | 36 | $Li_{1.5}Al_{0.5}Ti_{1.5}(PO_4)_3$ | Negative electrode | 10.0 |

TABLE 2

| | Capacity Retention Ratio (After 50 Cycles) (%) | Charge-and-Discharge Efficiency (After 50 Cycles) (%) | Capacity Retention Ratio (After 24 Hours) (%) |
|---|---|---|---|
| Example 1 | 80 | 78 | 42 |
| Example 2 | 75 | 76 | 35 |
| Example 3 | 77 | 77 | 37 |
| Example 4 | 88 | 82 | 55 |
| Example 5 | 81 | 78 | 41 |
| Example 6 | 82 | 77 | 41 |
| Example 7 | 80 | 78 | 40 |
| Example 8 | 79 | 77 | 44 |
| Example 9 | 81 | 79 | 41 |
| Example 10 | 81 | 78 | 39 |
| Example 11 | 82 | 79 | 43 |
| Example 12 | 81 | 78 | 39 |
| Example 13 | 82 | 76 | 40 |
| Example 14 | 89 | 92 | 85 |
| Example 15 | 82 | 76 | 41 |
| Example 16 | 84 | 77 | 42 |
| Example 17 | 88 | 83 | 58 |
| Example 18 | 89 | 85 | 62 |
| Example 19 | 77 | 78 | 41 |
| Example 20 | 88 | 77 | 41 |
| Example 21 | 81 | 78 | 40 |
| Example 22 | 82 | 77 | 44 |
| Example 23 | 79 | 75 | 42 |
| Example 24 | 79 | 77 | 41 |
| Example 25 | 78 | 74 | 38 |
| Example 26 | 77 | 71 | 35 |
| Example 27 | 76 | 65 | 32 |
| Comparative Example 1 | 50 | 51 | 10 |
| Comparative Example 2 | 46 | 32 | 5 |
| Comparative Example 3 | 95 | 99 | 97 |
| Comparative Example 4 | 45 | 45 | 8 |
| Comparative Example 5 | 48 | 47 | 9 |

As is apparent from comparison between Examples 1 to 27 and Comparative Examples 1 to 3, the secondary battery, in which the negative electrode porosity was within a range of 0.1% to 28%, the water content of the negative electrode active material-containing layer was 0.01 g/cm$^3$ to 0.4 g/cm$^3$, and the negative electrode active material-containing layer contains the solid electrolyte particles, is excellent in charge-and-discharge property, cycle life performance, and preservation characteristic.

As shown in Example 8, even when the solid electrolyte particles contain an organic compound having ion conductivity, excellent charge-and-discharge property, cycle life performance, and preservation characteristic can be achieved.

As shown in Example 11, when the positive electrode active material-containing layer contains solid electrolyte particles, the porosity of the positive electrode active material-containing layer is within a range of 1% to 30%, and the water content of the positive electrode active material-containing layer is within a range of 0.01 g/cm$^3$ to 0.4 g/cm$^3$, relatively excellent performance is exhibited as compared with the case in which the positive electrode active material-containing layer does not contain solid electrolyte particles (for example, Example 1).

For example, as shown in Example 2, Example 17, and Example 18, when the content of the solid electrolyte particles is large, charge-and-discharge property, cycle life performance, and preservation characteristic are excellent. However, in these cases, since the ratio of the weight of the active material particles to the weight of the active material-containing layer is small, it tends to be inferior to other Examples from the viewpoint of volume energy density.

As shown in Example 1, Examples 3 to 17, and Examples 20 to 27, when the negative electrode water content is within a range of 0.02 g/cm$^3$ to 0.18 g/cm$^3$, volume energy density also tends to be excellent while excellent charge-and-discharge property, cycle life performance, and preservation characteristic can be achieved.

LATP was used as the solid electrolyte in Example 1, but excellent charge-and-discharge property, cycle life performance, and preservation characteristic can be achieved even when the solid electrolyte is appropriately changed as in Examples 5 to 10.

As shown in Examples 24 to 27, even when the concentration of lithium chloride contained in the electrolytic solution is changed, the water content in the negative electrode does not change so much. However, as the concentration of lithium chloride is relatively high, charge-and-discharge property, cycle life performance, and preservation characteristic tend to be excellent. This is because the water decomposition reaction at the negative electrode hardly occurs when the number of free water molecules in the electrolytic solution is smaller. That is, as the concentration of the electrolyte salt is higher, the battery characteristics are more excellent.

In Comparative Example 1, since the negative electrode active material-containing layer does not contain a solid electrolyte, the negative electrode porosity is excessively high (30%). In addition, the negative electrode water content is relatively high. Therefore, Comparative Example 1 is inferior in charge-to-discharge property, cycle life performance, and preservation characteristic.

In Comparative Example 2, alumina is contained in the negative electrode active material-containing layer instead of the solid electrolyte. Alumina does not have lithium ion conductivity and does not correspond to the solid electrolyte. Therefore, the secondary battery according to Comparative Example 2 is inferior in charge-to-discharge property, cycle life performance, and preservation characteristic.

Comparative Example 3 is an example using a nonaqueous electrolytic solution instead of an aqueous electrolytic solution. In this case, battery performance is superior to other examples. However, there is a demerit that good battery characteristics can not be obtained unless strict water control is performed so that extra water does not enter the entire battery during the manufacture. When the negative electrode water content in Comparative Example 3 is within a range of 0.01 g/cm$^3$ to 0.4 g/cm$^3$, hydrogen gas is generated and the battery performance is remarkably deteriorated.

As shown in Comparative Example 4, when the negative electrode water content is out of a range of 0.01 g/cm$^3$ to 0.4 g/cm$^3$ and the negative electrode porosity also is out of a range of 0.1% to 28%, charge-and-discharge property, cycle life performance, and preservation characteristic are inferior.

In addition, as shown in Comparative Example 5, even when the negative electrode water content is within a range of 0.01 g/cm$^3$ to 0.4 g/cm$^3$ and the negative electrode porosity is out of a range of 0.1% to 28%, charge-and-discharge property, cycle life performance, and preservation characteristic are inferior.

According to at least one embodiment and Example described above, a secondary battery is provided. The secondary battery includes a positive electrode, an aqueous electrolyte, a separator, and a negative electrode including a negative electrode active material-containing layer, an aqueous electrolyte, and a separator. The negative electrode active material-containing layer includes negative electrode active material particles and solid electrolyte particles having lithium ion conductivity. The porosity of the negative electrode active material-containing layer is within a range of 0.1% to 28%. The water content of the negative electrode active material-containing layer is within a range of 0.01 g/cm$^3$ to 0.4 g/cm$^3$. Thus, it is possible to reduce the amount of water molecules in the negative electrode layer while suppressing the increase in electrode resistance, and it is possible to suppress the generation of hydrogen in the negative electrode. Therefore, it is possible to obtain a secondary battery that is excellent in charge-and-discharge property, preservation characteristic, and cycle life performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A secondary battery, comprising:
    a positive electrode;
    an aqueous electrolyte;
    a separator; and
    a negative electrode comprising a negative electrode active material-containing layer,
    wherein the negative electrode active material-containing layer comprises negative electrode active material particles and solid electrolyte particles having lithium ion conductivity,
    wherein the negative electrode active material particles comprise titanium-containing oxides,
    wherein a porosity of the negative electrode active material-containing layer is within a range of 0.1 to 18%,
    wherein a water content of the negative electrode active material-containing layer is within a range of 0.01 g/cm$^3$ to 0.22 g/cm$^3$, and
    wherein the solid electrolyte particles comprise at least one selected from the group consisting of an inorganic compound represented by LiM$_2$(PO$_4$)$_3$ having a NASICON skeleton, where M is at least one material selected from Ti, Ge, Sr, Zr, Sn, and Al, an oxide having the garnet structure, amorphous LIPON (Li$_{2.9}$PO$_{3.3}$N$_{0.46}$), and polymeric solid electrolyte particles having a lithium ion conductivity of 1×10$^{-10}$ S/cm or more at 25° C., and
    wherein the oxide having the garnet structure is at least one selected from the group consisting of Li$_{5+x}$A$_y$La$_{3-y}$M$_2$O$_{12}$ (A is at least one selected from the group consisting of Ca, Sr, and Ba, and M is at least one selected from the group consisting of Nb and Ta), Li$_3$M$_{2-x}$Zr$_2$O$_{12}$ (M is at least one material selected from the group consisting of Ta and Nb), Li$_{7-3x}$Al$_x$La$_3$Zr$_3$O$_{12}$, and Li$_7$La$_3$Zr$_2$O$_{12}$, where x is 0≤x<0.8 and y is 0≤y<2.

2. The secondary battery according to claim 1, wherein the solid electrolyte particles have a lithium ion conductivity of 1×10$^{-6}$ S/cm or more at 25° C.

3. The secondary battery according to claim 1, wherein the water content of the negative electrode active material-containing layer is within a range of 0.02 g/cm$^3$ to 0.22 g/cm$^3$.

4. The secondary battery according to claim 1, wherein a density of the negative electrode is within a range of 1.9 g/cm$^3$ to 2.8 g/cm$^3$.

5. The secondary battery according to claim 1, wherein the aqueous electrolyte comprises an electrolyte salt at a concentration of 6 mol/L to 12 mol/L.

6. The secondary battery according to claim 1, wherein the positive electrode comprises a positive electrode active material-containing layer,
    the positive electrode active material-containing layer comprises positive electrode active material particles and the solid electrolyte particles, and
    a porosity of the positive electrode active material-containing layer is within a range of 1% to 30%, and a water content of the positive electrode active material-containing layer is within a range of 0.01 g/cm$^3$ to 0.4 g/cm$^3$.

7. The secondary battery according to claim 1, wherein a ratio of a weight of the solid electrolyte particles to a weight of the negative electrode active material-containing layer is within a range of 0.01% by weight to 50% by weight.

8. A battery pack comprising the secondary battery according to claim 1.

9. The battery pack according to claim 8, further comprising an external power distribution terminal and a protective circuit.

10. The battery pack according to claim 8, further comprising plural of the secondary battery,
    wherein the secondary batteries are electrically connected in series, in parallel, or in combination of series connection and parallel connection.

11. A vehicle comprising the battery pack according to claim 8.

12. The vehicle according to claim 11, which comprises a mechanism configured to convert kinetic energy of the vehicle into regenerative energy.

13. The secondary battery according to claim 1, wherein an average particle size of the negative electrode active material particles is larger than an average particle size of the solid electrolyte particles.

14. The secondary battery according to claim 1, wherein a true density of the solid electrolyte particles is higher than a true density of the negative electrode active material particles.

15. The secondary battery according to claim 1, wherein:
    the water content of the negative electrode active material-containing layer is within a range of 0.06 g/cm$^3$ to 0.15 g/cm$^3$; and
    the porosity of the negative electrode active material-containing layer is within a range of 1% to 18%.

16. The secondary battery according to claim 1, wherein the aqueous electrolyte comprises an electrolyte salt at a concentration of 6 mol/L or more.

17. The secondary battery according to claim 1, wherein the solid electrolyte particles comprise the at least one selected from the group consisting of an inorganic compound represented by LiM$_2$(PO$_4$)$_3$ having a NASICON skeleton, where M is at least one material selected from Ti, Ge, Sr, Zr, Sn, and Al, an oxide having the garnet structure, and amorphous LIPON (Li$_{2.9}$PO$_{3.3}$N$_{0.46}$).

18. The secondary battery according to claim 1, wherein an average particle size of the solid electrolyte particles is within a range of 0.05 μm to 10 μm.

19. The secondary battery according to claim 1, wherein the polymeric solid electrolyte particles are present and comprise an organic compound comprising at least one selected from a group consisting of a polyether-based material, a polyester-based material, a polyamine-based material, a polyethylene-based material, and a polysulfide-based material.

20. The secondary battery according to claim 1, wherein the polymeric solid electrolyte particles are present and have a lithium ion conductivity of $1\times10^{-10}$ S/cm or more at 25° C.

* * * * *